United States Patent
Gudaz et al.

(10) Patent No.: US 6,510,353 B1
(45) Date of Patent: Jan. 21, 2003

(54) DETERMINING TUNING PARAMETERS FOR A PROCESS CONTROLLER FROM A ROBUSTNESS MAP

(75) Inventors: John A. Gudaz, Bel Air, MD (US); Yan Zhang, Austin, TX (US); Wilhelm K. Wojsznis, Round Rock, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 09/434,776

(22) Filed: Nov. 4, 1999

(51) Int. Cl.$^7$ .............................................. G05B 13/02

(52) U.S. Cl. ............................. 700/37; 700/52; 700/54; 700/71

(58) Field of Search ...................... 700/37, 52, 54, 700/71

(56) References Cited

U.S. PATENT DOCUMENTS

| | | | |
|---|---|---|---|
| 4,549,123 A | 10/1985 | Hägglund et al. | 318/610 |
| 4,602,326 A | 7/1986 | Kraus | 364/160 |
| 5,283,729 A | 2/1994 | Lloyd | 364/157 |
| 5,301,101 A | 4/1994 | MacArthur et al. | 364/156 |
| 5,347,446 A | 9/1994 | Iino et al. | 364/149 |
| 5,353,207 A | 10/1994 | Keeler et al. | 364/164 |
| 5,394,322 A | 2/1995 | Hansen | 364/148 |
| 5,457,625 A | 10/1995 | Lin et al. | 364/149 |
| 5,517,424 A | 5/1996 | Marcelle et al. | 364/494 |
| 5,559,690 A | 9/1996 | Keeler et al. | 364/164 |
| 5,594,858 A | 1/1997 | Blevins | 395/326 |
| 5,659,467 A | 8/1997 | Vickers | 364/138 |
| 5,659,667 A | 8/1997 | Buescher et al. | 395/23 |
| 5,704,011 A | 12/1997 | Hansen et al. | 395/22 |

(List continued on next page.)

FOREIGN PATENT DOCUMENTS

| | | |
|---|---|---|
| GB | 2 278 936 | 12/1994 |
| GB | 2 348 021 | 9/2000 |
| JP | 10 333704 | 12/1998 |
| WO | WO 99/19778 | 4/1999 |

OTHER PUBLICATIONS

GB Patent Application No GB 0026537.1 Search Report dated Mar. 8, 2001.
CE4.2:CL6211 Manual, *Fisher-Rosemount Systems, Inc.*, p. 3–22 to 3–26 (1990).

(List continued on next page.)

*Primary Examiner*—Thomas Black
*Assistant Examiner*—Ronald D Hartman, Jr.
(74) *Attorney, Agent, or Firm*—Marshall, Gerstein & Borun

(57) ABSTRACT

A simulation procedure simulates the response of a process control loop having a controller tuned according to a set of tuning parameters to illustrate, for example, the overshoot, oscillation, response time, etc. of the controller as tuned. As part of the simulation procedure, a robustness map, such as a plot illustrating phase margin versus gain margin or other robustness qualities, is created and the robustness of the simulated control loop may be plotted as a point on the robustness map. During the creation of the robustness map, different sets of tuning parameters for a region in which the process control loop is stable are determined and stored and the corresponding robustness qualities of the loop having a controller tuned according to these tuning parameters are also determined and stored. The robustness map is then displayed to a user showing the stable region. Thereafter, a user may select any point within the stable region on the robustness map and, upon doing so, a set of tuning parameters that will produce a control loop with the selected robustness characteristics will then be determined from the previously calculated sets of tuning parameters and robustness qualities. The simulation routine may then simulate the control loop using these new tuning parameters to enable a user to view the performance characteristics of the resulting control loop.

38 Claims, 9 Drawing Sheets

U.S. PATENT DOCUMENTS

| | | | | |
|---|---|---|---|---|
| 5,740,033 | A | 4/1998 | Wassick et al. | 364/149 |
| 5,748,467 | A | 5/1998 | Qin et al. | 364/148 |
| 5,768,119 | A | 6/1998 | Havekost et al. | 364/133 |
| 5,781,432 | A | 7/1998 | Keeler et al. | 364/164 |
| 5,801,942 | A | 9/1998 | Nixon et al. | 364/188 |
| 5,825,646 | A | 10/1998 | Keeler et al. | 364/164 |
| 5,828,851 | A | 10/1998 | Nixon et al. | 395/285 |
| 5,838,563 | A | 11/1998 | Dove et al. | 364/188 |
| 5,841,652 | A | 11/1998 | Sanchez | 364/164 |
| 5,859,773 | A | 1/1999 | Keeler et al. | 364/164 |
| 6,198,246 | B1 * | 3/2001 | Yutkowitz | 318/561 |

OTHER PUBLICATIONS

CE10.0:CL6633:vol. 2 Manual, *Fisher–Rosemount Systems, Inc.*, p. Glossary–17 (1994).

Configuring CL6010, CL6210, and CL7010 Series Interactive and Computing Controllers, *Fisher Controls* (1985).

Delta V™ System Overview Brochure, Fisher–Rosemount Systems, 32 pages (1998).

DeltaV™ Product Data Sheets, DeltaV Control Network, Workstation Specifications, DeltaV Controller, DeltaV Power Supplies, DeltaV I/O Subsystem, DeltaV Diagnostics, DeltaV Event Chronicle, DeltaV Excel Add–in, DeltaV Real–Time Data Server, 56 pages (1996).

Edgar et al., "Optimization of Chemical Processes," Chapter 7, *McGraw–Hill, Inc.*, pp. 251–298 (1988).

Froisy, "Model Predictive Control: Past, Present and Future," *33 ISA Transactions* pp. 235–243 (1994).

Hoffman et al., "Model Predictive Control: Future Requirements and Trends," ISA, 1993, Paper #93–369, pp. 1241–1247 (Oct. 1993).

Intelligent Field Devices—Role Changes, *FRSI/RMD/MP/TLB*, 7 pages (1997).

Kuo, "Digital Control System," $2^{nd}$ Ed., *Saudners College Publishing*, Chapter 3 and 8 (1992).

Ott et al., "Auto–Tuning From Ziegler–Nichols to Model Based Rules," *Fisher–Rosemount Systems*, Inc., 10 pages, no date.

User Manual for Types ACS401 DEC OpenVMS VAX Intelligent Tuner and ACS411 DEC OpenVMS AXP Intelligent Tuner Software, *Fisher Rosemount Systems, Inc.* (1997).

McMillan, "Process Control Optimization," slides entitled "Breaking Into Model Based Control" presented at *Fisher–Rosemount Systems Advanced Control Seminar*, San Antonio (Nov. 1997).

Qin et al., "An Overview of Industrial Model Predictive Control Technology," AIChE Conference, pp. 1–31 (1996).

Wilhelm et al., "Advanced Process Control In Record Time," Control Magazine Software and Information Systems (May 1999).

Provisional Application No. 60/132,780, filed May 6, 1999, "Integrating Distributed Process Control System Functionality on a Single Computer".

U.S. patent application Ser. No: 09/070,090, filed May 28, 1993, "System and Method for Automatically Tuning a Process Controller".

U.S. patent application No. 08/105,899, "Method and Appartaus for Fuzzy Logic Control with Automatic Tuning," filed Aug. 11, 1993.

U.S. patent application Ser. No: 09/151,084, filed Sep. 10, 1998, "A Shadow Function Block Interface for Use in a Process Control Network".

* cited by examiner

DETERMINING TUNING PARAMETERS FOR A PROCESS CONTROLLER FROM A ROBUSTNESS MAP

FIELD OF THE INVENTION

The present invention relates generally to process control networks and, more specifically, to a system and method for determining tuning parameters for a process controller within a process control system based on a robustness map.

DESCRIPTION OF THE RELATED ART

Process control networks, such as those used in chemical, petroleum or other processes, have generally included a centralized process controller communicatively coupled to one or more field devices which may be, for example, valve positioners, switches, sensors (such as temperature, pressure and flow rate sensors), etc. These field devices may perform physical control functions within the process (such as opening or closing a valve), may take measurements within the process for use in controlling the operation of the process or may perform any other desired function within the process. Process controllers have historically been connected to field devices via one or more analog signal lines or buses which may carry, for example, 4–20 mA (milliamp) signals to and from the field devices. Generally speaking, the process controller receives signals indicative of measurements made by one or more field devices and/or other information pertaining to the field devices, uses this information to implement a typically complex control routine and then generates control signals which are sent via the analog signal buses to the field devices to thereby control the operation of the process.

Recently, there has been a move within the process control industry to implement field-based digital communications within the process control environment. For example, the process control industry has developed a number of standard, open, digital or combined digital and analog communication protocols such as the HART®, PROFIBUS®, WORLDFIP®, Device-Net® and CAN protocols. These digital communication protocols generally enable more field devices to be connected to a particular bus, support more and faster communication between the field devices and the controller and/or allow field devices to send more and different types of information, such as information pertaining to the status and configuration of the field device itself, to the process controller. Furthermore, these standard digital protocols enable field devices made by different manufacturers to be used together within the same process control network.

Also, there is now a move within the process control industry to decentralize process control and, thereby, simplify process controllers. Decentralized control is obtained by having field mounted process control devices, such as valve positioners, transmitters, etc. perform one or more process control functions using what are typically referred to as function blocks or control blocks and by then communicating data across a bus structure for use by other process control devices (or function blocks) in performing other control functions. To implement these control functions, each process control device typically includes a microprocessor having the capability to implement one or more function blocks as well as the ability to communicate with other process control devices using a standard and open communication protocol. In this manner, field devices can be interconnected within a process control network to communicate with one another and to perform one or more process control functions forming a control loop without the intervention of a centralized process controller. The all-digital, two-wire bus protocol now being promulgated by the Fieldbus Foundation, known as the FOUNDATION™ Fieldbus (hereinafter "Fieldbus") protocol is one open communication protocol that allows devices made by different manufacturers to interoperate and to communicate with one another via a standard bus to effect decentralized control within a process.

Tuning of any control block or control loop in a prior art system that has the entire process control routine (e.g., all of the function blocks of the control routine) or parts thereof located within one or more centralized controllers is fairly simple because the entire tuning routine can also be stored in the centralized controller. When tuning of a control loop of such a centralized control routine is desired, the separate tuning routine within the centralized controller forces the appropriate control block, such as a proportional-integral (PI) or proportional-integral-derivative (PID) control block, through a tuning procedure like an induced oscillation procedure, to determine predefined characteristics of the process or the loop. During this dynamic data capture phase of the tuning procedure, the tuning routine collects data generated by the loop, which is being delivered to the centralized controller per normal operation, and determines from this data one or more process characteristics, such as the ultimate gain, the time constant, etc. of the process. Once the desired process characteristics are calculated, the tuning routine applies a set of rules or other algorithms using the calculated process characteristics to determine new tuning parameters for the control block or control loop. This step is commonly referred to as the rule application phase of the tuning procedure. Thereafter, the tuning routine delivers the new tuning parameters to the control block (or control loop) and the tuning procedure is complete. Because, in a centralized process control system, all of the control functions are located within the controller and all of the data necessary for tuning is provided to the controller during normal operation of the process, the tuning routine has direct access to the control blocks and to the data necessary for performing the tuning routine.

With decentralized communication protocols in which control blocks or control elements, such as PI, PID, fuzzy logic, etc. control blocks, are located in a distributed manner throughout a process control network, it is harder to tune the control blocks (or control loops within which these blocks are operating) because the control blocks are located away from the centralized controller (or other device) where the tuning routine is typically stored. In one known prior art system used for implementing tuning in a distributed process control environment, the entire tuning procedure remains within the centralized process controller. This system, however, cannot perform fast tuning because it must communicate over a bus network (which is providing other communications within the process) to receive the data developed during the tuning routine and, unfortunately, the amount of data (or speed at which the tuning routine can receive this data) is limited by the constraints of the bus throughput. Furthermore, because the bus communications are controlled by a separate bus controller and not by the tuning routine, the tuning routine cannot strictly control the exact times at which the tuning control signals are delivered to the control block in order to start, stop and implement different segments of the tuning procedure. This, in turn, means that the tuning control routine does not have strict control over the timing of the tuning procedure, which may lead to inaccurate results.

In another known prior art system that provides tuning within a distributed process control environment, the entire tuning routine is placed within the same device as the control block to be tuned (such as the PID function block) and, in fact, is actually incorporated into the functionality of the control block. While this system is able to control the timing of the tuning procedure precisely and to collect data at any desired rate (because the tuning routine does not have to communicate with the control block via a bus), the tuning routine must be compiled along with and at the same time as the control block, which increases the overhead (e.g., the timing, processing, memory, etc. requirements) associated with the use of the control block during normal operation of the process, even though the functionality of the auto-tuning routine is used relatively infrequently during normal operation of the control loop. Furthermore, a complete auto-tuning routine must be placed within each different device in which a control block is located in order to enable auto-tuning of each control block, which adds unneeded redundancy to and increases the cost of the process control system.

Furthermore, some known auto-tuners (whether used in centralized control systems or distributed control systems) produce a set of tuning parameters for a specified type of controller, such as a PID (proportional-integral-derivative) controller, based on a set of determined process characteristics and then run a simulation routine that simulates the response of the process to the controller when the controller uses the tuning parameters. This simulation routine may, for example, simulate control of the process using a step response, an impulse response, etc. to enable the operator to view the gain, response time, overshoot, oscillation, etc. associated with the controller having the determined set of tuning parameters. These prior art systems may also determine whether the set of tuning parameters as used in the controller will lead to an unstable control loop. In one known system, the robustness of the resulting controller can be plotted as a point on a robustness map that illustrates, for example, the gain margin versus phase margin for the control loop. However, if the user does not like the robustness of the resulting controller, the user must manually chose other tuning parameters which may or may not result in a controller having a desired robustness, or the user must change some of the variables used to determine the set of tuning parameters in the first place, such as the type of controller to be used, to get a new set of tuning parameters. In either case, the user still cannot select a set of tuning parameters for a particular type of controller by specifying the desired robustness of the control loop, which means that the user is stuck with a robustness associated with the tuning parameters determined using a provided auto-tuning method or that the user must go through a complicated manual trial and error procedure to determine a set of tuning parameters that produces a controller which causes a control loop to have a particular robustness.

SUMMARY OF THE INVENTION

A simulation procedure simulates the response of a calculated set of tuning parameters (determined by, for example, an auto-tuning procedure) to illustrate, for example, the overshoot, oscillation, response time, etc. of the controller as tuned. As part of the simulation procedure, a robustness map, such as a plot illustrating phase margin versus gain margin or other robustness qualities, is created and the robustness of the simulated control loop may be plotted as a point on the robustness map. During the creation of the robustness map, different sets of tuning parameters for a region in which the process control loop is stable are determined and stored and the corresponding robustness qualities of the loop having a controller tuned according to these tuning parameters are also determined and stored. The robustness map is then displayed to a user showing the stable region. Thereafter, a user may select any point within the stable region on the robustness map and, upon doing so, a set of tuning parameters that can be used to produce a control loop with the selected robustness characteristics will then be determined from the previously calculated sets of tuning parameters and robustness qualities. The simulation routine may then simulate the control loop tuned according to these new tuning parameters to enable a user to view the performance characteristics of the resulting control loop. If desired, points on the robustness map may be plotted in a manner that illustrates whether the control loop using tuning parameters associated with these points will be stable or unstable.

According to one aspect of the invention, a method of determining tuning parameters for use in tuning a controller used in a process control loop creates a robustness map that plots a robustness quality (such as gain margin) of the process control loop. To create the robustness map, the method determines a plurality of sets of tuning parameters and a value for the robustness quality of the process control loop for each of the sets of tuning parameters. The method then enables a user to select a point within the robustness map and uses at least two of the determined plurality of sets of tuning parameters to generate a further set of tuning parameters which, when used to tune the controller, causes the process control loop to have the approximate value of the robustness quality associated with the selected point.

If desired, the step of creating the robustness map may include the step of plotting two or more robustness qualities and the step of determining may include the steps of varying one of the robustness qualities over a range and determining a set of tuning parameters (including, for example, a maximum forward path gain) and another one of the robustness qualities for each of a number of selected values within the range. If desired, the method may interpolate between the at least two of the determined plurality of sets of tuning parameters to determine the further set of tuning parameters.

In one embodiment, the method also simulates the process control loop when using a controller tuned according to the further set of tuning parameters and may determine a dynamic margin associated with the further set of tuning parameters. Also, if desired, the method may create the robustness map as a plot that plots phase margin versus gain margin.

According to another aspect of the invention, a method of determining a set of tuning parameters for use in tuning a controller that is adapted to be used in a process control loop determines a plurality of sets of tuning parameters for use in tuning the controller and an associated robustness quality for each of the plurality of sets of tuning parameters, wherein the plurality of sets of tuning parameters and associated robustness quality define a stable region within a robustness map. The method then plots the stable region of the robustness map to illustrate the robustness quality of the stable region and enables a user to select a point within the robustness map. The method then uses at least two of the plurality of sets of tuning parameters to determine a further set of tuning parameters, wherein said further set of tuning parameters is associated with the selected point within the robustness map so that the controller, when tuned according to the further set of tuning parameters, causes the process control loop to have approximately the robustness quality of the selected point.

According to a still further aspect of the invention, a tuning system adapted to be used with a processor to tune a process control loop having a controller capable of being tuned according to a set of tuning factors includes a computer readable medium and first, second and third routines stored on the computer readable medium and adapted to be executed on the processor. The first routine is adapted to create a robustness map by determining a plurality of sets of tuning parameters for use in tuning the controller and an associated robustness quality for each of the sets of tuning parameters, wherein the plurality of sets of tuning parameters and associated robustness quality define a continuous region within the robustness map. The second routine is adapted to enable a user to select a point within the robustness map and the third routine is adapted to use at least two of the determined plurality of sets of tuning parameters to generate a further set of tuning parameters which, when used to tune the controller, causes the process control loop to have the approximate robustness quality associated with the selected point.

DESCRIPTION OF THE PREFERRED EMBODIMENTS

Figure 1:
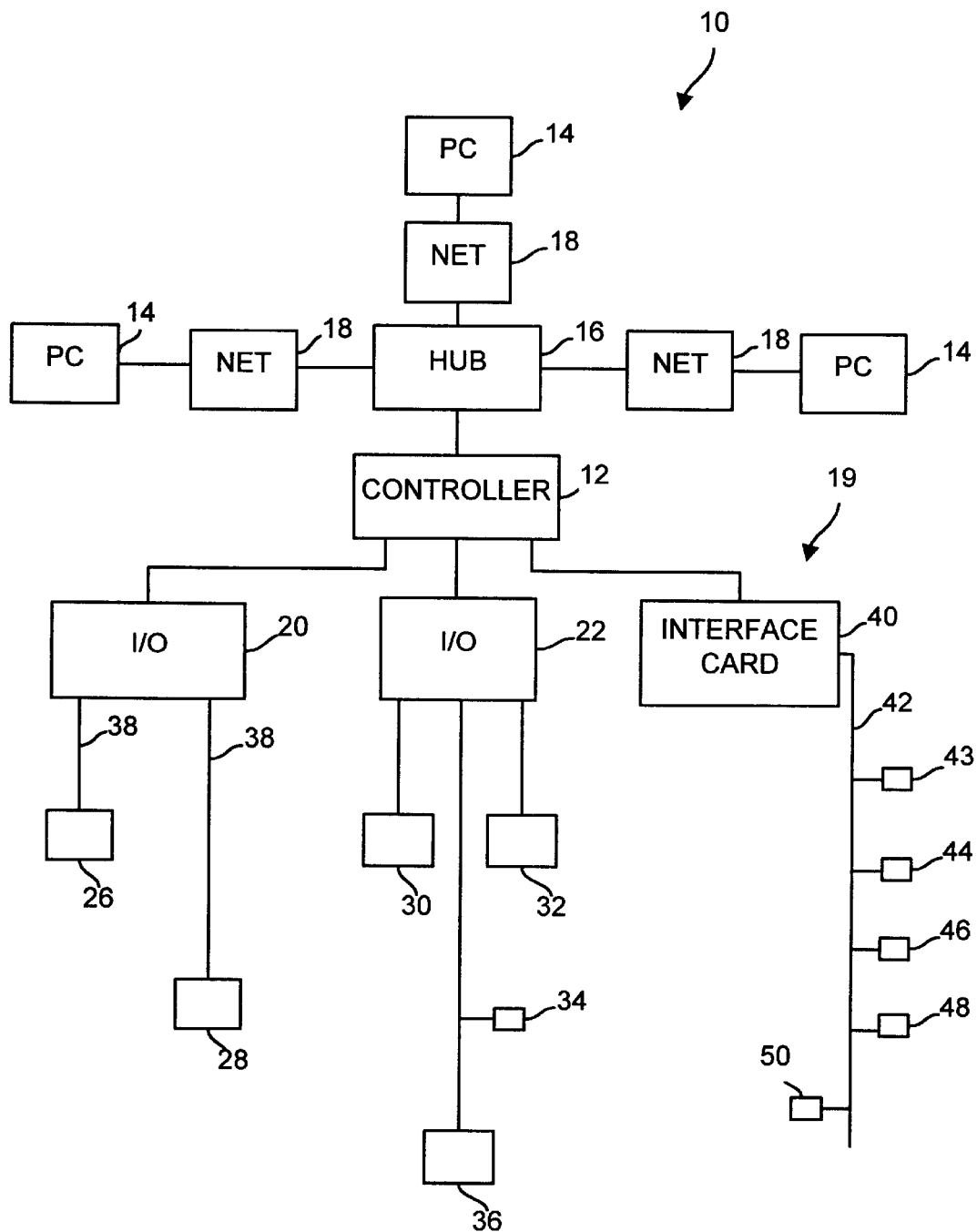
FIG. 1 is a schematic block diagram of a process control network having distributed control elements which use an auto-tuner.

Referring now to FIG. 1, a process control network 10 is illustrated in block diagram form. The process control network 10 includes one or more centralized process controllers 12 (only one of which is shown in FIG. 1) capable of implementing a process control routine stored therein and/or capable of communicating with control elements, such as function blocks, located within field devices distributed throughout the process control network 10. The controller 12 may be, by way of example only, the DeltaV™ controller sold by Fisher-Rosemount Systems, Inc. and may be connected to numerous workstations such as personal computers (PCs) 14 via a hub 16 and ethernet connections 18. In this configuration, the PCs 14 may be used by one or more operators or users to communicate with the process controller 12 or the field devices to thereby obtain information pertaining to elements of the process control network 10, to review or change the status of elements within the process control network 10, to obtain information pertaining to individual field devices within the process control network 10, etc. If the controller 12 is a DeltaV controller, it may provide a graphical depiction of the process control routine within the controller 12 to the user via one of the PCs 14 illustrating the function blocks or other control elements within the process control routine and the manner in which these function blocks are linked together to provide control of the process. Furthermore, if desired, a user or operator may be able to initiate tuning of one or more of the function blocks or control loops from one of the PCs 14.

As illustrated in FIG. 1, the centralized controller 12 is connected to numerous field devices located throughout a process (indicated generally by reference number 19). The centralized controller 12 may communicate through any standard types of I/O cards 20 and 22 to typical field devices 26, 28, 30, 32, 34 and 36 which are subject to centralized control from the controller 12. The I/O card 20 may be, for example, an analog I/O card that connects the controller 12 to analog field devices 26 and 28 which communicate over 4 to 20 mA buses 38. Likewise, the I/O card 22 may be a digital or combined digital and analog I/O card that communicates with digital or mixed digital and analog field devices using, for example, the 4 to 20 mA analog format or any other desired format. Of course, the field devices 26, 28, 30, 32, 34 and 36 may be any types of field devices including transmitters, sensors, valve positioners, valve controllers, etc. As will be understood for the example process control network 10 illustrated in FIG. 1, the field devices 26–36 are associated with portions of the process 19 subject to centralized control by a control routine stored within the controller 12.

The controller 12 is also communicatively connected to an interface card 40 which, in turn, is connected to (or is part of) a process control network in which process control is performed in a distributed manner. In the embodiment illustrated in FIG. 1, the decentralized process control portion of the process 19 includes the interface card 40, a bus 42 and numerous field devices 43, 44, 46, 48 and 50 connected to the bus 42. The device 43 may be, by way of example, a transmitter that measures some process variable while the device 44 may be a positioner/valve device that controls the flow of a fluid within the process. The distributed process control network of FIG. 1 may be, for example, a Fieldbus network which uses the Fieldbus communication protocol and the interface card 40 may be a link active scheduler associated with the Fieldbus communication protocol.

The centralized process control routine located within the controller 12 receives inputs from the field devices 26–36 and potentially 43–50, performs calculations and other activities associated with the control routine and then sends commands to the field devices via the I/O cards 20 and 22 and the interface card 40 to implement any desired control of the process 19. It should be noted, however, that the decentralized process control portion of the process control network 10 (i.e., that associated with the bus 42 in FIG. 1) may implement its own process control routine in a decentralized manner in conjunction with (or instead of) the control being performed by the controller 12. Thus, while the controller 12 may interface with and perform some control over the devices 43–50 connected to the bus 42, these devices may also implement control functions or function blocks that are not associated with control performed by the controller 12 but that are, instead, distributed throughout the devices connected to the bus 42. In any case, the auto-tuner described herein may be used to tune any control element (such as a function block) located in any of the field devices 26–36 and 43–50 or the controller 12 of FIG. 1.

While, in the preferred embodiment, the decentralized portion of the process control network 10 uses the Fieldbus communication and control protocol, it could use any other known or desired protocol as well, including protocols developed in the future. Generally speaking, the Fieldbus protocol is an all-digital, serial, two-way communication protocol that provides a standardized physical interface to a two-wire loop or bus interconnecting "field" equipment such as sensors, actuators, device controllers, valves, etc. located in an instrumentation or process control environment of, for example, a factory or a plant. The Fieldbus protocol provides, in effect, a local area network for field instruments (field devices) within a process, which enables these field devices to perform control functions at locations distributed throughout a process facility and to communicate with one another before and after the performance of these control functions to implement an overall control strategy. Because the Fieldbus protocol enables control functions to be distributed throughout a process control network, it reduces the workload of the centralized process controller 12 or eliminates the need of the centralized processor 12 for those field devices or areas of the process.

It will be understood that, while the Fieldbus protocol is a relatively new all-digital communication protocol developed for use in process control networks, this protocol is known in the art and is described in detail in numerous articles, brochures and specifications published, distributed, and available from, among others, the Fieldbus Foundation, a not-for-profit organization headquartered in Austin, Tex. As a result, the details of the Fieldbus communication protocol will not be described in detail herein.

Figure 2:
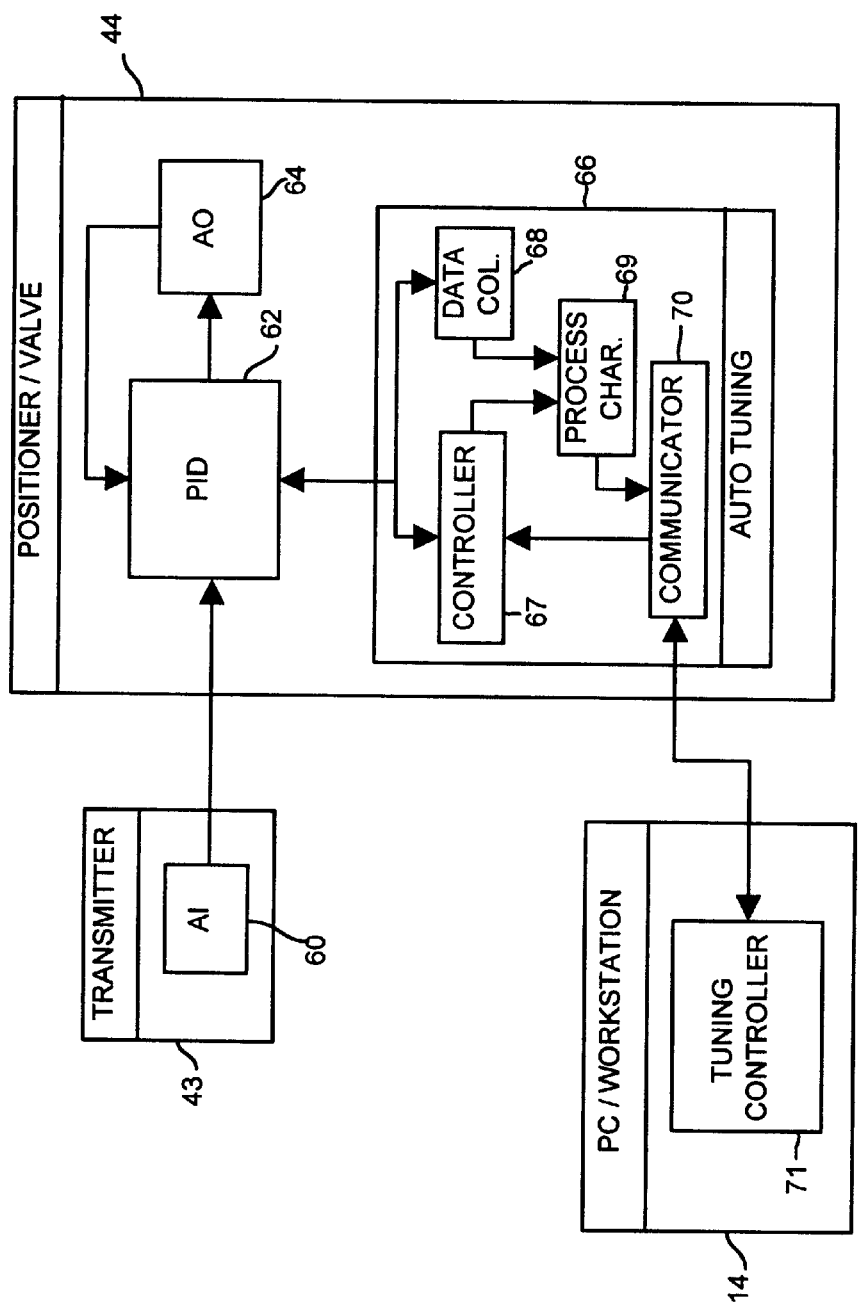
FIG. 2 is a schematic block diagram of an embodiment of an auto-tuner used in a control loop within a distributed process control environment.

FIG. 2 depicts a schematic block diagram of interconnected function blocks making up a control loop that may be implemented within, for example, a Fieldbus network or any other distributed control environment in which the function blocks within a control loop are located in different devices interconnected by a communication network such as a bus. The control loop illustrated in FIG. 2 includes an analog input (AI) function block 60 (which may be, for example, located in the transmitter 43 of FIG. 1), a PID function block 62 and an analog output (AO) function block 64. For the example loop of FIG. 2, the PID function block 62 and the AO function block 64 are located in the positioner/valve 44 of FIG. 1. The communication connections between the function blocks 60, 62 and 64 are illustrated in FIG. 2 by lines attaching the process and control inputs and outputs of these functions blocks. Thus, the output of the AI function block 60, which may comprise a process variable measurement or process parameter signal, is communicatively coupled via the Fieldbus wire 42 to the input of the PID function block 62 which, in turn, has an output comprising a control signal communicatively coupled to an input of the AO function block 64. An output of the AO function block 64, which comprises a feedback signal indicating, for example, the position of the valve 44, is connected to a control input of the PID function block 62. The PID function block 62 uses this feedback signal along with the process measurement signal from the AI function block 60 (and potentially other signals or setpoints) to perform any desired control of the AO function block 64 to thereby control the process variable measured by the AI function block 60. The connections indicated by the lines in the control loop diagram of FIG. 2 may be performed internally within a field device when, as in the case of the AO and the PID function blocks 64 and 62, the function blocks are within the same field device.

An auto-tuner for use in tuning the control element 62 includes an auto-tuning function block 66 located within the positioner/valve 44. The auto-tuning function block 66 is communicatively coupled to and controls the PID function block 62 during operation of a dynamic data capture phase of a tuning procedure by sending signals to the inputs thereof, changing an output, etc. In particular, during the dynamic data capture phase of the tuning procedure, a control element controller 67 (which may be, for example, a signal generator implemented in either hardware or software) drives the control loop comprising the function blocks 60, 62 and 64 into a controlled induced oscillation procedure (or drives the control loop to implement any other desired tuning procedure). A data collection unit 68 collects data generated by or delivered to the PID function block 62 (or any other portion of the loop) during this procedure and, preferably, stores this data in a memory of the device 44. A process characteristic determining unit 69 may then determine any desired process characteristics, which may be any process, loop or device characteristics, from the collected data using any known or desired procedure. Thereafter, a communication unit 70 provides the calculated process characteristics (or the data necessary for determining such characteristics) to a tuning controller 71 which, preferably, is located in one of the operator workstations or PCs 14 but may be located in the centralized controller 12, etc. apart from the device 44 in which the auto-tuning function block 66 is located.

During the tuning procedure, the auto-tuning function block 66 forces the process loop to undergo certain changes and senses various quantities or signals existing within the process control loop to determine one or more process characteristics of the process or control loop. These process characteristics (or the data captured during the tuning procedure) are delivered to a tuning controller 71, which is located in a different device, for use in user interface support and in developing one or more sets of control or tuning parameters. It will be understood that the use of the PID function block 62 is merely exemplary and the auto-tuning function block 66 could be used with any other type of function block in any other control loop. Furthermore, the tuning controller 71 can be located in any other device including, for example, a user or operator interface device (such as any workstation), any controller, or even another field device.

It will be understood that the individual elements of the auto-tuning function block 66 can be implemented in any desired manner. For example, in the preferred embodiment, each of these elements is implemented in software run on the processor associated with device in which the auto-tuning function block 66 is stored. In this case, the control element controller 67 may be a series of instructions to be used in communicating with and controlling the inputs to and the outputs of the PID function block 62 or other function block being tuned. Likewise, the data collection unit 68 may monitor certain desired signals associated with, for example, the PID function block 62 and store data indicative of these signals in a memory of the device 44. The process characteristic determining unit 69 may be implemented in software to calculate or otherwise determine one or more process characteristics from the stored or collected data and the communication unit 70 may communicate with the tuning controller 71 using the communication protocol or setup of the device 44. For example, in a Fieldbus device, the communication unit 70 may cause the communication system already provided within the device 44 to communicate the process characteristics over the Fieldbus bus 42 to the tuning controller 71. In the Fieldbus environment, the individual units 67, 68, 69 and 70 may be packaged together as a stand-alone Fieldbus function block or may be provided within the PID function block 62. Alternatively, any or all of the units 67, 68, 69 and/or 70 could be implemented in software, hardware or firmware in any other process control environment.

The auto-tuning function block 66 and, more particularly, the control element controller 67, may use any desired tuning procedure such as any open-loop or closed-loop technique during the tuning procedure. Likewise, the auto-tuning function block 67 may measure any desired variables including, for example, the output of the AO function block 64, the setpoint of the PID function block 62, the output of the AI function block 60, etc. to determine the desired process or loop characteristics. In a preferred embodiment, the auto-tuning function block 66 is configured to use a controlled induced oscillation procedure to determine the desired process characteristics. In such a configuration, the controller 67 of the auto-tuning function block 66 applies, to a control input of the PID function block 62, a square wave signal having a selectable peak-to-peak value of 2$d$ centered about the value of the control signal delivered to the PID function block 62 before induced oscillation was initiated. In response to such a square wave signal, the control loop of FIG. 2 undergoes induced oscillation and the output of the AI function block 60 (i.e., the process variable) oscillates having a peak-to-peak amplitude 2$a$ and a period $T_u$. From the amplitude a of the process variable and the amplitude of the square wave signal, the ultimate gain $K_u$ of the process can be derived according to the equation:

$$K_u = \frac{4d}{\pi a} \quad (1)$$

The ultimate period $T_u$ of the process can be calculated as being equal to the period of oscillation of the process variable. The auto-tuning function block 66 may, of course, measure other data and determine other desired process characteristics including, for example, the time delay $T_d$ and the dominant time constant of the process.

After calculating such process characteristics, the auto-tuning function block 66 provides these characteristics to the tuning controller 71 which determines, from the quantities $K_u$ and $T_u$, a preliminary set of control or tuning parameters including, for example, the proportional gain $K_p$ (or Kp), the integral time constant $T_i$ (or Ti) and the derivative time constant $T_d$ (or Td) of the PID control function block 62. If desired however, the auto-tuning function block 66 may capture the necessary data, store that data and provide the stored data to the tuning controller 71 via a bus in non-real time, in which case, the tuning controller 71 may calculate the desired process or loop characteristics in any desired manner.

Notwithstanding the above discussion, it will be understood that the auto-tuning function block 66 may implement any desired dynamic data capture routine including any of the numerous routines which are known for control loops having PI, PID, fuzzy logic or other types of control elements therein. For example, the auto-tuning function block 66 may implement a controlled induced oscillation procedure, such as a Hägglund-Åström relay tuning procedure described in U.S. Pat. No. 4,549,123, the disclosure of which is hereby expressly incorporated by reference herein. In the relay type tuning method, the auto-tuning function block 66 brings the process loop (made up of the function blocks 60, 62 and 64) into self-oscillation using, for example, a non-linear feedback function and measures the response of the process loop to determine desired process characteristics, such as the ultimate gain and the ultimate period.

Alternatively, the auto-tuning function block 66 may incorporate the design of any one of the tuners described in a co-pending patent application Ser. No. 08/105,899 now U.S. Pat. No. 6,330,484, entitled "Method and Apparatus for Fuzzy Logic Control with Automatic Tuning," filed Aug. 11, 1993, the disclosure of which is expressly incorporated by reference herein. For example, the auto-tuning function block 66 (in particular, the process characteristic calculator 69) may perform a model matching tuning procedure in which signature analysis is performed on a process variable to select, from a plurality of stored mathematical models, the model that most accurately characterizes the process or loop. The process characteristics of the process loop are then determined from the selected model.

Still further, the auto-tuning function block 66 may determine the process characteristics of the loop using a pattern-recognition method of process characterization, such as that disclosed in U.S. Pat. No. 4,602,326, the disclosure of which is hereby expressly incorporated by reference herein. In the pattern recognition method of tuning, the characteristics of the process or loop are determined by observing a process variable as it responds to a process upset condition. The pattern of the process variable produced as a result of the process upset condition is then analyzed to determine the desired characteristics of the process or loop.

Still further, the auto-tuning function block 66 may use any signal injection method of determining the characteristics of a process (e.g., a loop) such as, for example, those disclosed in U.S. Pat. No. 5,283,729 and U.S. patent application Ser. No. 08/070,090 now U.S. Pat. No. 5,453,925, entitled "System and Method for Automatically Tuning a Process Controller," filed May 28, 1993, the disclosure of each of which is expressly incorporated by reference herein. However, any other tuning procedure may be used, as desired, and the auto-tuning controller 66 is not limited to use with the specific tuning procedures described or referred to herein.

Likewise, the tuning controller 71 may use any desired method of determining tuning parameters from the process or loop characteristics (or raw data) calculated by or collected by the auto-tuning function block 66. For example, the tuning controller 71 may use any of the tuning parameter calculations methods described or referred to in U.S. Pat. No. 5,748,467, the disclosure of which is hereby expressly incorporated by reference herein, including, for example, internal model control (IMC) tuning, Cohen and Coon tuning, Ziegler-Nichols tuning, or modified Ziegler-Nichols tuning, to name a few.

In general, the tuning controller 71 stores one or more sets of rules (e.g., such as a fuzzy logic rule set, a neural network configuration or rule set, or any set of linear or non-linear algorithms) which it uses to determine tuning parameters, such as the gain and time constant, according to the type of function block being tuned. Still further, the tuning controller 71 (which may communicate with any number of different auto-tuning function blocks in different devices) may store different sets of tuning parameter calculation rules for different types of control blocks or loops and, thus, may be used to tune any or all of PID, PI, fuzzy logic or other control elements within a process control system. Because the tuning controller 71 can store many different sets of rules to be used with different types of control elements and can apply whatever set of rules is appropriate when calculating the new tuning parameters based on the dynamic process characteristics determined by the auto-tuning function block 66, only a single tuning controller 71 needs to be located in any process control network.

After the tuning controller 71 determines the new tuning parameters, it provides these parameters to the appropriate control element, such as the PID function block 62 of FIG. 2 via the bus 42. If desired, the tuning controller 71 may provide the tuning parameters to the auto-tuning function block 66 which may then provide these parameters to the PID function block 62.

Using the separated function setup described above, wherein the functions performed during the dynamic data capture phase of tuning are separated from the functions performed during the rule application phase of tuning, the auto-tuner is able to control the timing of the operation of the control loop in a very precise manner during the dynamic data capture phase of the tuning procedure. Still further, this auto-tuner is able to detect and store as much data as necessary to accurately determine the process characteristics of the control loop being tuned because data communications are not occurring in real time over a bus. Also, because the rule applying functions associated with determining new tuning parameters based on process or loop characteristics (which can be quite involved) are not performed in the device or by the function block used to control the loop, these functions do not need to be coded into the operating loop. This, in turn, reduces the overhead of the loop as compared with systems in which the entire tuning routine is located within the control block being tuned.

Figure 3:
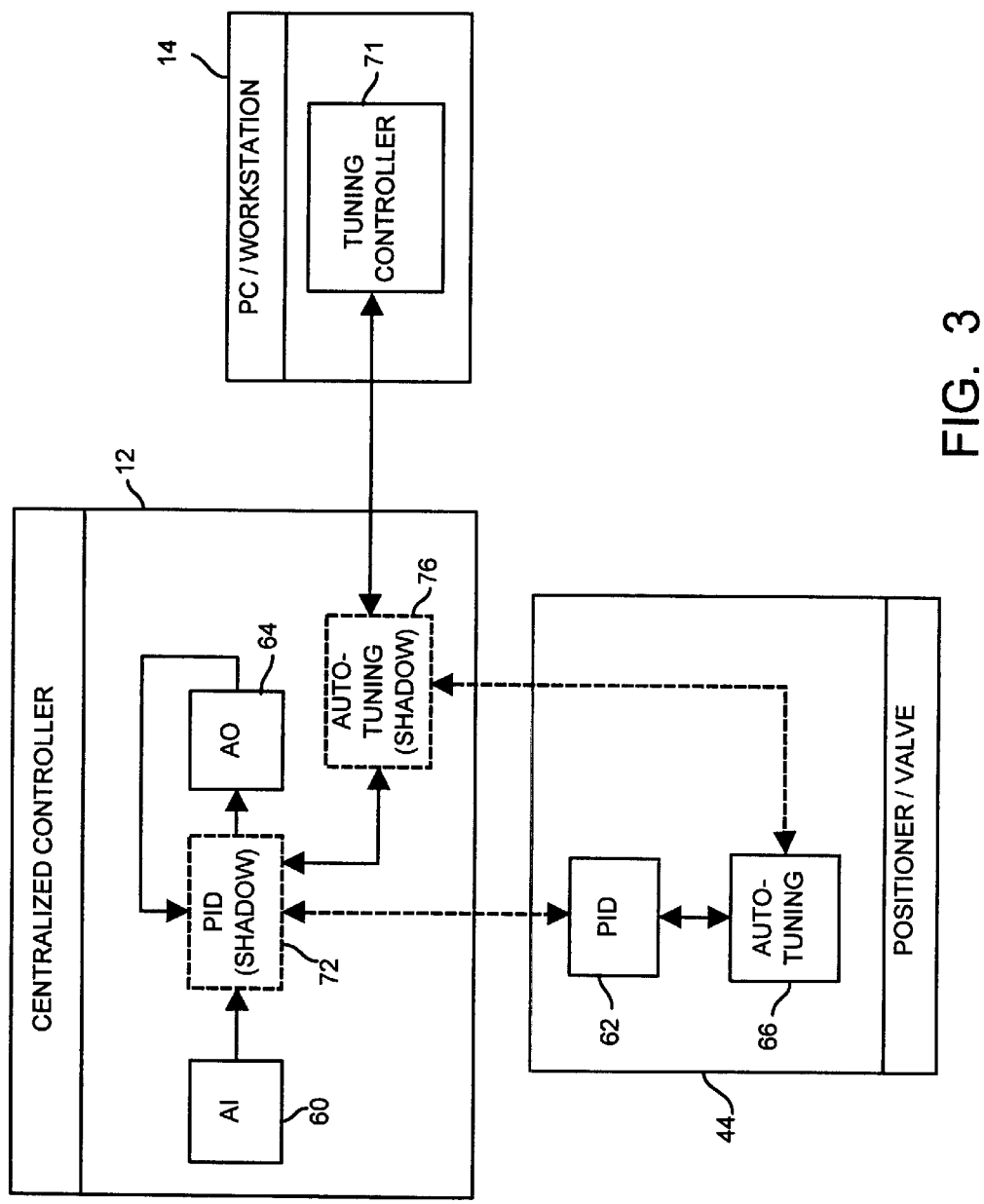
FIG. 3 is a schematic block diagram of a further embodiment of an auto-tuner used in a control loop within a process control environment having both distributed and centralized control elements.

Referring now to FIG. 3, a further auto-tuner is illustrated for use in an environment having control blocks or control functions implemented in both a centralized and a decentralized manner. In this example, the AI function block 60 and the AO function block 64 are located within and are run by the centralized controller 12 of FIG. 1 which communicates with a transmitter device and a valve/positioner device (which may be any of the devices 26, 28, 30, 32, 34 or 36 of FIG. 1) to obtain the inputs and outputs of these function blocks. However, the PID function block 62 is stored in and is implemented by the positioner/valve device 44 in the decentralized Fieldbus network of FIG. 1 and communicates with the centralized controller 12 via the Fieldbus link 42 and interface card 40 of FIG. 1.

In this embodiment, the centralized controller 12 includes a shadow PID function block 72 (indicated by a dashed block) which mirrors the inputs and outputs and other data associated with the PID function block 62 and which communicates with the AI and AO function blocks 60 and 64 as if the PID function block 62 was stored in and implemented by the centralized controller 12. More particularly, when the shadow PID function block 72 receives inputs via links from the AI and AO function blocks 60 and 64, it immediately sends these inputs to the actual PID function block 62 within the positioner/valve 44. The communications between the shadow PID function block 72 and the actual PID function block 62, indicated by a dashed line in FIG. 3, are performed using the communication protocol associated with the field device 44, in this case the Fieldbus protocol. The actual PID function block 62 then performs its control functions based on the received inputs in a standard manner, as if the AO and AI function blocks 60 and 64 were Fieldbus function blocks within the Fieldbus network.

Likewise, the shadow PID function block 72 is configured to receive periodic updates of the outputs and other data indicative of the state of the actual PID function block 62 and to communicate such data via links within the controller 12 to the AI and AO function blocks 60 and 64 at appropriate times. In this manner, it appears to the AI and AO function blocks 60 and 64 that the PID control function is provided within the centralized controller 12. These blocks can communicate with the shadow PID function block 72 in the same manner that these blocks communicate with any other function block executed by the centralized controller 12. The details concerning the implementation of a shadow function block are not the subject of the present invention but are described in detail in U.S. patent application Ser. No. 09/151,084 entitled "A Shadow Function Block Interface For Use in a Process Control Network," filed Sep. 10, 1998 which is assigned to the assignee of the present invention, the disclosure of which is hereby expressly incorporated by reference herein.

In the embodiment of FIG. 3, the auto-tuning function block 66 is located within the positioner/valve 44 and communicates with and controls the actual PID function block 62, as described with respect to FIG. 2, to implement a tuning procedure. Similar to the PID function block 62, the auto-tuning function block 66 has a shadow auto-tuning function block 76 located within the controller 12. The actual auto-tuning function block 66 communicates with the shadow auto-tuning function block 76 and sends data (such as calculated process or loop characteristics) to the shadow auto-tuning function block 76 and receives commands or other data from the shadow auto-tuning function block 76. As with the embodiment of FIG. 2, the tuning controller 71 of the auto-tuner is stored within and implemented by the workstation or PC 14 but could, instead, be within the controller 12 or any other desired device. The tuning controller 71 communicates with the shadow auto-tuning function block 76 to, for example, initiate a tuning procedure, to receive process or loop characteristics developed by the auto-tuning function block 66 or to receive data collected by or indicative of the state of the auto-tuning function block 66.

When tuning is desired in the embodiment of FIG. 3, the tuning controller 71 receives a command (e.g., from a user or a further controller within the process control network) to initiate tuning. The tuning controller 71 then sends a tuning initiation command to the shadow auto-tuning function block 76 which sends this command to the actual auto-tuning function block 66. In response to this command, the actual auto-tuning function block 66 begins a tuning procedure, such as any of those described above with respect to the embodiment of FIG. 2, collects data generated by the loop during the tuning procedure and then calculates or otherwise determines one or more desired process characteristics. The actual auto-tuning function block 66 then provides these characteristics (or the collected data) to the shadow auto-tuning function block 76 which communicates this information to the tuning controller 71.

Alternatively, the shadow auto-tuning function block 76 or the tuning controller 71 may change the state of the shadow PID function block 72 (which changes the state of the actual PID function block 62) forcing the actual PID function block 62 to call or otherwise communicate with the actual auto-tuning function block 66 to thereby implement the tuning procedure. In this case, the shadow auto-tuning function block 76 may be initiated or installed automatically upon the change of state of the PID function block 62.

In either case, the tuning controller 71 determines new tuning parameters based on the received data (such as the calculated loop or process characteristics) using any desired tuning parameter calculation method. The tuning controller 71 then sends such tuning parameters to the shadow PID function block 72 (or any other function block as needed) and the shadow PID function block 72 sends these new tuning parameters to the actual PID function block 62 where they are used by the PID function block 62 during normal operation of the loop.

It will be understood that, while desirable, the use of the shadow auto-tuning function block 76 is not necessary and, instead, the tuning controller 71 could communicate directly with the auto-tuning function block 66 to implement a tuning procedure. Furthermore, while the embodiments of FIGS. 2 and 3 illustrate the auto-tuning function block 66 as a separate function block from the PID function block 62, the functionality of the auto-tuning function block 66 could, instead, be incorporated into the PID (or other control) function block 62 instead of being a separate function block.

Preferably, the auto-tuning shadow function block 76 has attributes that are identical to those of the auto-tuning function block 66 of the Fieldbus device. In one embodiment, however, the standard Fieldbus attributes of STRATEGY, ALERT_KEY, MODE_BLK and BLOCK_ERR need not be provided in the shadow auto-tuning function block 76, although they are provided in the actual auto-tuning function block 66. Also, the auto-tuning shadow function block 76 need not be directly visible to the user because it is used by the tuning controller 71 only during the identification phase (i.e., the dynamic data capture phase) of the tuning procedure to initiate control and to provide communication between the tuning controller 71 and the auto-tuning function block 66. None-the-less, the parameters of the auto-tuning shadow function block 76 are available to and are used by the tuning controller 71 and by the tuning user interface application and can be obtained by a user application if so desired. Still further, the Fieldbus PID function block 62 is preferably modified to include the starting index of the auto-tuner function block 66, which index is also available for use by the shadow auto-tuning function block 76. This enables the PID function block 62 to be controlled by the auto-tuning function block 66.

Process characteristic information may be included in, for example, a Fieldbus auto-tuning function block 66, as well as the shadow auto-tuning function block 76, as attributes in the same manner as other attributes associated with any other type of Fieldbus function block. Those skilled in the art will know that different attributes can be provided in the actual auto-tuning function block 66, as well as the shadow auto-tuning function block 76, depending on the different type of tuning being used and the different aspects of the system in which the auto-tuner is located. Some example process characteristics or information that can be provided by an auto-tuning function block are defined below as:

T_IPGAIN—Integrating Process Gain—The rate of change in a process output for a unit step change in the input;

T_UGAIN—Ultimate Gain—The value of the proportional only controller gain at which a loop is marginally stable, that is, on the borderline between stability and instability;

T_UPERIOD—Ultimate Period—The period of oscillation of a loop when its controller gain is set to the ultimate gain of the process;

T_PSGAIN—Process Static Gain—The ratio of process output change to process input change;

T_PTIMEC—Process Time Constant—The time duration between when a system starts to respond to a step input and when it reaches 63 percent of its final, steady-state value; and T_PDTIME—Process Delay Time—The length of time between when a control action is taken and when the process starts to respond to this action.

These attributes are calculated in the auto-tuning function block 66 when a tuning test is complete and are then submitted to the tuning controller 71 in, for example, the workstation 14, which uses one or more of these process characteristic information or attributes to determine tuning parameters, such as gain, integral time (the inverse of reset) and derivative time (rate) for, e.g., a PI or PID or fuzzy logic controller. In one embodiment, the above-listed attributes may be floating point data, be stored in non-volatile memory as static data, and may be accessed as read only data. Also, each of the above listed attributes may be made available in view 1 and 3 of the Fieldbus or the DeltaV protocol. It will be understood that the view list in the Fieldbus or the DeltaV protocol defines the parameters that will be provided by a single request (i.e. a view) for information from the function block. Thus, using a view request, the shadow auto-tuning function block 66 may obtain the most recent values for a large number of the attributes available from the auto-tuning function block 66.

Furthermore, it will be understood that the attributes or process characteristics listed above are associated with one possible implementation of an auto-tuner and that there are other attributes and information that can be provided by other auto-tuners configured to operate in other ways. Such other process characteristic information may include any desired types of gains, such as ultimate gain, static gain and integral gain, times, such as the ultimate period, the dead time and the derivative time, and any time constants associated with the process, as well as other desired information.

It will also be understood that the exact type of auto-tuning implemented is not important and the list provided above is merely an example of some types of process characteristic information that may be made available to the tuning controller 71 to enable the tuning controller 71 to determine one or more tuning parameters. If desired, the tuning controller 71 may use any type of PID, fuzzy logic, neural network, etc. process to determine tuning parameters, such as controller gain, reset, rate, etc. from inputs such as ultimate gain, ultimate period and dead time.

In one embodiment, the auto-tuning application (i.e., the tuning controller 71) writes to a TUNSKI attribute of the shadow PID function block 72 to indicate that the auto-tuning is to be performed on the associated function block within the Fieldbus device (i.e., the actual PID function block 62.) In response to this attribute change, an instance of the shadow auto-tuning block 76 is created in the centralized controller 12. (Incidentally, the tuning controller 71 also writes to the TUNSKI attribute to indicate when auto-tuning is complete, which causes the shadow auto-tuning function block 76 to be discarded.) After the shadow auto-tuning function block 76 is created, the state of the associated auto-tuning function block 66 in the Fieldbus device is read. If the state of the auto-tuning function block 66 is clear (T_Request=0) then tuning may proceed. However, if the T_Request attribute is not 0, then tuning is active within the Fieldbus device. In this case, the tuning request is not honored and the instance of the shadow auto-tuning function block 76 is deleted to thereby stop auto-tuning.

When an instance of the shadow auto-tuning function block 76 is created, its static and dynamic attributes reflect those of the auto-tuning function block 66. These values will be accessed by the auto-tuning application (i.e., the tuning controller 71) as though a PID function block in the centralized controller 12 were being tuned. Thus, if the auto-tuning application 71 writes a new value to an attribute of the shadow auto-tuning function block 76, the shadow auto-tuning function block 76 initiates a write of this attribute value to the associated auto-tuning function block 66. Likewise, when the auto-tuning function block 66 is actively working within a Fieldbus device, the shadow auto-tuning function block 76 periodically gets the dynamic attribute values (view 3 in the Fieldbus protocol) of the auto-tuning function block 66. Because the auto-tuning function block 66 is defined as a function block, this view will be accessed in the same manner as in other blocks. The dynamic attribute values provided in response to the view request are then used in the shadow block 76 to update its dynamic attribute values. When the Fieldbus interface card 40 (of FIG. 1) sees a change in a static attribute value, it requests all of the static attributes (view 4) from the auto-tuning function block 66. The static values received in response to this request are then used to update the attributes of the shadow auto-tuning function block 76.

Furthermore, when a device within a device library associated with the centralized controller 12 contains a PID function block, this template information may include one static attribute associated with the PID function block that defines the object dictionary index for the start of the auto-tuning function block associated therewith within the device, such as within the positioner/valve 44 of FIG. 3. Generally speaking, only one auto-tuning function block needs to exist in a device that contains one or more PID (and/or other control) blocks. However, the auto-tuning function block 66 will not, preferably, be defined as a block in the device template and thus, will not be shown in the library. None-the-less, when the shadow auto-tuning function block 76 is created by the centralized controller 12, the index of the auto-tuning function block 66 will be used by the shadow auto-tuning function block 76. Based on this index, a proxy will be established in the Fieldbus interface card 40 for the auto-tuning function block 66. In this manner, the auto-tuning attributes in the remote (e.g., Fieldbus) device will only be accessed when the auto-tuner application is activated and the associated PID function block 62 has been selected for tuning. If the PID function block 62 is running in the remote device, then the PID function block reference to the auto-tuning function block in that device will be known. If the PID function block is running in the centralized controller 12, then the auto-tuning block will be instantiated by the PID block at the start of auto-tuning.

Figure 4:
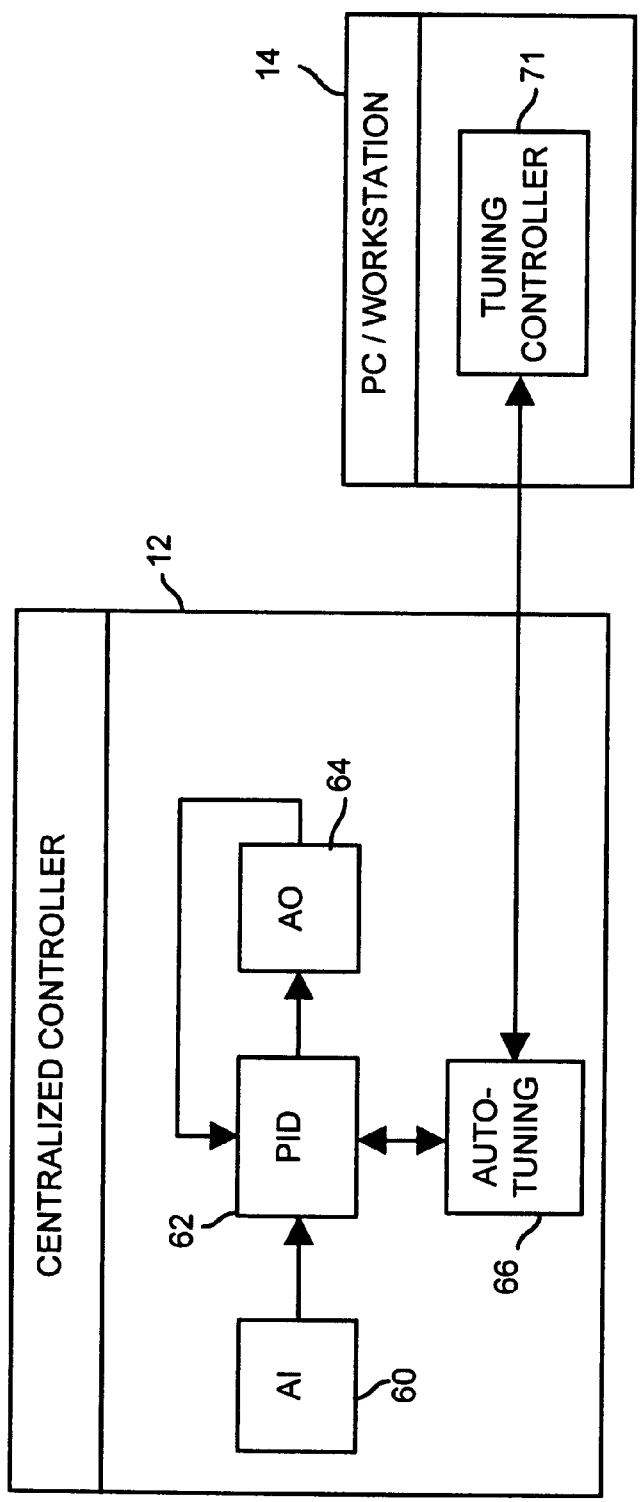
FIG. 4 is a schematic block diagram of a still further embodiment of an auto-tuner used in a control loop within a process control environment having centralized control elements.

Referring now to FIG. 4, another embodiment illustrates the case in which the actual auto tuning function block 66 is located in the controller 12 and is used to tune a PID function block 62 also located within the controller 12. This configuration may be used when, for example, it is desired to tune a control block that controls a non-smart device or any other device, the operation of which is controlled by control function blocks executed by the centralized controller 12. It will be understood that the tuning controller 71 operates in the same manner as in the embodiment of FIG. 3 except that the tuning controller 71 communicates directly with the actual auto-tuning function block 66 which, in turn, communicates with the actual PID function block 62, both of which are stored in the controller 12.

Of course, if desired, the auto-tuning function block could be provided in the user interface or workstation 14 in any standard or known manner to perform auto-tuning of a process control loop.

In one embodiment, the auto-tuning function block 66 is provided as a modifier function block within the remote (e.g., Fieldbus) device or within the controller 12. Generally speaking, a modifier function block is a function block that modifies the algorithm of an original or base function block (such as the PID function block 62) without being a part of the original or base function block.

Figure 5:
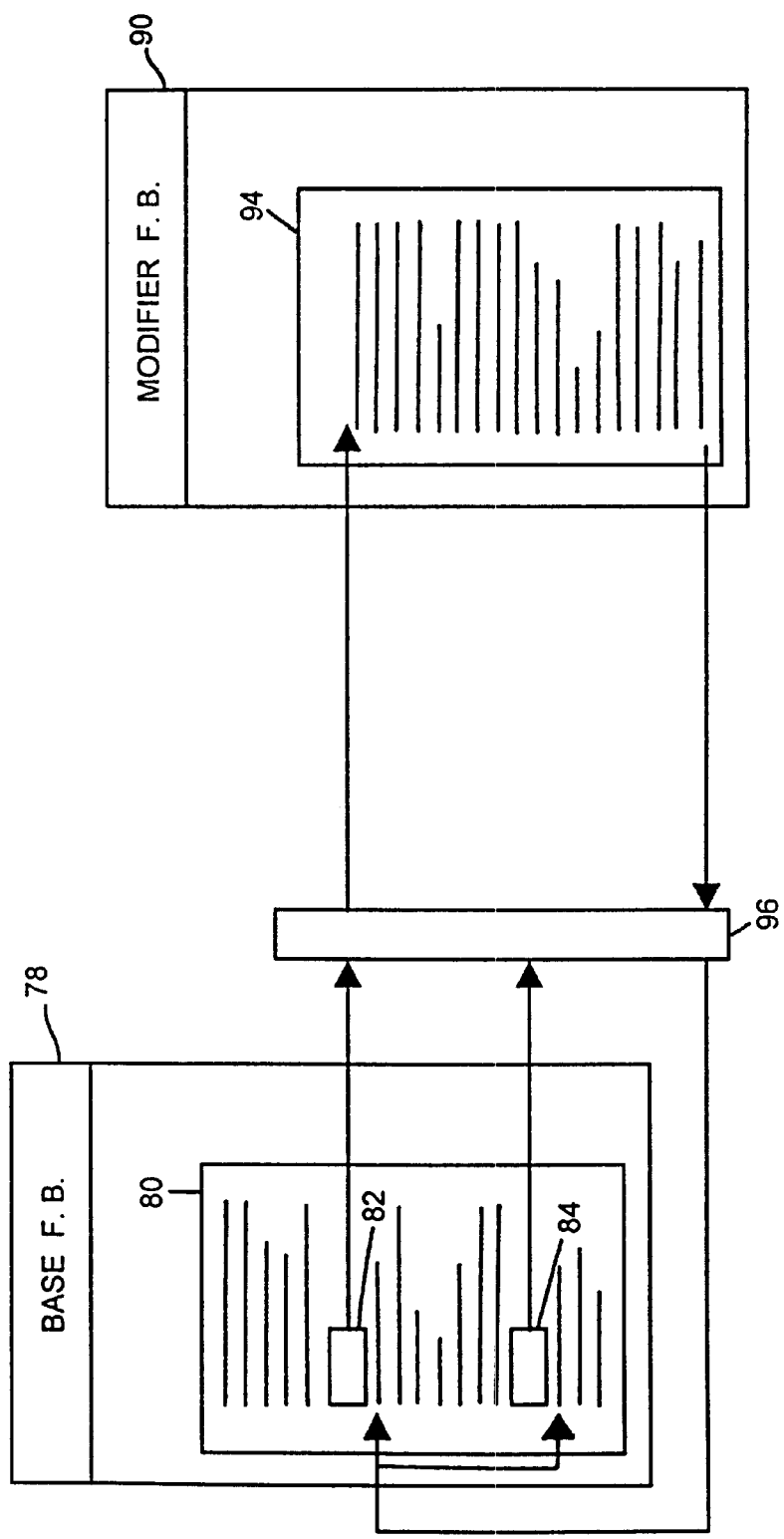
FIG. 5 is a schematic block diagram of an auto-tuning function block implemented as a modifier function block within a process control environment.

The concept of a modifier function block will be described in detail with respect to FIG. 5 depicting a base or original function block 78 which, in this example, may be the PID function block 62 of FIGS. 2, 3 and 4. As will be understood, the base or original function block 78 includes an algorithm 80 therein having lines of code or other types of code implemented by a processor. At one or multiple points within the code, illustrated in FIG. 5 as the points 82 and 84, a break or branching point is set within the algorithm 80. One or both of these branching points 82 and 84 may be used to provide enhanced capability within the algorithm 80, such enhanced capability being provided by a modifier function block 90 having an algorithm 94 therein.

Generally speaking, the branching points 82 and 84 along with any other desired branching points are set up in the base function block 78 when it is created. However, the contents of the branching point may be changed after compiling the base function block 78 to include a pointer either to the modifier function block 90 or to another line of code in the base algorithm 80. Initially, the pointer at the break point 82 is set to point to or to cause the algorithm 80 to continue with the next line of code within the algorithm 80 and, thus, operate without the enhanced capability. However, when some enhanced capability or functionality is desired to be added to the base function block 78, the pointer at one or more branching points (e.g., the point 82) is set to cause the algorithm 80 to call or otherwise transfer control to the algorithm 94 within the modifier function block 90 when the algorithm 80 reaches that branching point. If desired, the pointer 82 may store an address indicating the address of the modifier function block 90 in memory, or may be any other branching device or method used to pass control to the modifier function block 90.

When control is passed to the modifier function block 90, certain predefined data is sent to or made available to the modifier function block 90 which the modifier function block 90 uses or changes during operation of the algorithm 94. This data is provided through a fixed or predefined interface, illustrated in FIG. 5 as the interface 96. The interface 96 typically includes any of the parameter or data values required for use by the modifier function block 90 (or pointers thereto, such as addresses), where to return control within the base function block 78 and/or any other data or information needed by the modifier function block 90 to take control, execute, and return control to the base function block 78. When receiving control, the modifier function block 90 implements its algorithm 94 acting on the data provided via the interface 96 and, when complete, returns control to the point in the algorithm 80 of the base function block that immediately proceeds (in the execution sense) the break or branching point from which control was released. The modifier function block 90 returns certain data via the interface 96 (which may be the same or different interface than that used to send control to the modifier function block 90) which data is used by the algorithm 80 in the base function block 78.

While two branching points 82 and 84 are illustrated in FIG. 5, one, three or any other number of branching points could be placed in the original function block 80 to provide for enhanced capability at one or more points in the algorithm 80. Furthermore, the branching points within the base function block 78 may be set to call different parts or subroutines of the algorithm 94 within the modifier function block 90 to thereby provide different enhanced functions at different parts of the base algorithm 80. This functionality may be necessary to implement an entirely new functionality, such as tuning, within the base function block 78, which may need to have different capabilities added at different points within the base algorithm 80. Of course, different branching points within the base algorithm 80 may be set up to call the same or different parts of a single modifier function block or may be set up to call different modifier function blocks.

When initially sold, the base function block 78 can be provided merely with branching points 82 and 84 (as well as any other desired branching points) which allow enhanced capability of modifier function blocks to be provided to the user at a later date. When the user does not need or want to implement the functionality associated with modifier function block(s), the user needs only to store a null value or some other indication at the branching points within the base algorithm 80 that the algorithm 80 should continue without calling a modifier function block. When a modifier function block capability is to be added, the values or pointers at one or more of the branching points within the base algorithm 80 are changed to cause the base algorithm 80 to call the appropriate modifier function block when the branching point is reached. Typically, this can be done without recompiling the base function block 78. Thereafter, the modifier function block 90 is called when the base algorithm 80 reaches the branching point. When called, the modifier function block 90 implements its algorithm 94 to enhance or change the functionality of the algorithm 80 within the base function block 78. However, when the enhanced or new functionality is no longer desired, such as at the end of a tuning procedure, the branching points can be reset to prevent the base function block 78 from calling the modifier function block 90.

In this manner, the base function block 78 can be initially sold without the upgraded capability, which reduces the documentation and overhead associated with that function block. However, the base function block 78 can be upgraded merely by adding an appropriate modifier function block 90 to the device in which the base function block 78 is stored and changing the pointers within the algorithm 80 of the base function block 78. This enables base function blocks to be enhanced or changed at a later date without having to implement a whole new base function block and without having to recompile the base function block 78, which makes upgrading the base function block 78 easier. Furthermore, different modifier function blocks can be developed for the same base function block which gives the user even more choices in terms of upgrading the system. This also enables function block providers to supply different versions or upgrades of a modifier function block with relative ease. Furthermore, the algorithm 80 of the base function block 78 does not have to be modified to provide additional capability where a block is designed to support a standard interface to modifier blocks. Likewise, support for added functionality is invoked only as is indicated by block attributes set during configuration or through a custom application such as the tuning application described herein. This results in reduced memory and CPU requirements when the features provided by a modifier function block are not required during normal operation of the process. As will be understood, when using modifier function blocks, the base function block remains the same except for the fact that it must be have the capability to call the modifier function block, i.e., having one or more resettable branching points therein.

When used in a Fieldbus environment, the modifier function block 90 (in this case, the auto-tuning function block 66) will execute in the same execution time frame as the base function block (e.g., the PID function block 62). Furthermore, the modifier function block 90 need not be visible to a user as a function block within the system because it is merely modifying the algorithm 80 of a base function block 78. If desired, however, the auto-tuner application user interface can obtain information from the modifier function block 90 using the well-known OPC protocol. Still further, it is easier to change the code of a base function block 78 by merely changing the code of the modifier function block 90, which can be added to and deleted from the system more easily than the base function block 78. This greatly speeds up the development of advanced control capabilities and means that a customer will only have to add overhead to the basic function block when that customer has a particular application which uses those features. That is, the customer can reduce the overhead of the system by not using and compiling the modifier function block when the added functionality provided by the modifier function block is not needed.

While the description hereof has been directed to the implementation and use of an auto-tuner having a single auto-tuning function block 66 and a single tuning controller 71, it will be understood that the auto-tuner can include a single or multiple tuning controllers 71 and/or multiple auto-tuning function blocks 66 located in different devices. Furthermore, it will be understood that a single auto-tuning function block 66 can be used to implement the dynamic data capture phase of multiple different control blocks within the same device and, as such, a device that has two or more control blocks still need have only one auto-tuning function block. Likewise, the same type of auto-tuning function block can be used with different types of control blocks (such as PI, PID and fuzzy logic control blocks) because the same dynamic data capture techniques can be used for loops having each of these different types of control elements. Auto-tuning function blocks can also be implemented using any external process control communication protocol (besides the Fieldbus protocol) and may be used to communicate with any type of function block including any function block that is similar to or the same as any of the different function blocks specifically identified by and supported by the Fieldbus protocol. Moreover, while the auto-tuning function block is described herein as a Fieldbus "function block," it is noted that the use of the expression "function block" herein is not limited to what the Fieldbus protocol identifies as a function block but, instead, includes any other type of block, program, hardware, firmware, etc., associated with any type of control system and/or communication protocol and that can be used to implement some control function. Thus, while function blocks typically take the form of objects within an object oriented programming environment, this need not be case and can, instead, be other logical units used to perform particular control (including input and output) functions within a process control environment.

Generally speaking, any of the above-described, or any other tuning method may be used to generate a set of tuning parameters for a controller within a process control system. However, the generated set of tuning parameters may not be satisfactory if, for example, they do not result in a process control loop having desired robustness qualities. While some known tuning procedures calculate certain robustness qualities, such as the phase margin and gain margin for a resulting control loop and may plot this loop as a point within a robustness map, the user cannot specify a certain desired set of robustness qualities and automatically have a set of tuning parameters determined which will result in a control loop having the desired robustness qualities.

Figure 6:
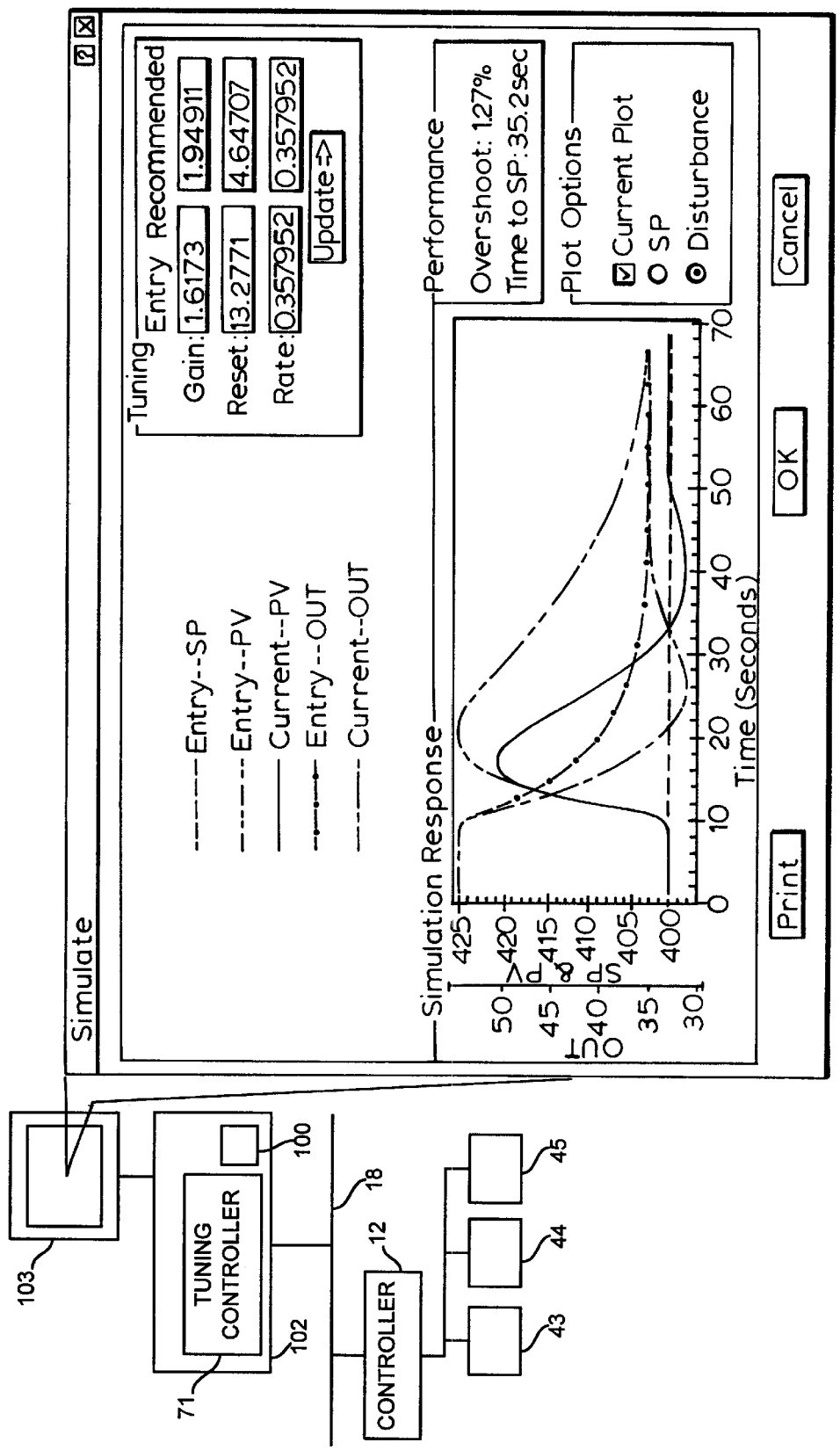
FIG. 6 is a block diagram of a process control system having a user interface that displays an example simulation graph related to the operation of the controller within a process using a determined set of tuning parameters.

Referring now to FIG. 6, a routine 100 which may be stored in a processing device 102 (which may be one of the hosts or workstations 14 of FIG. 1) simulates a process control loop having a determined set of tuning parameters for a controller thereof, generates a robustness map for the control loop and enables a user to generate further sets of tuning parameters for the control loop by selecting points within the robustness map. While the process control system illustrated in FIG. 6 includes the processor 102 (having associated memory) and a user interface 103 connected to the controller 12 which, in turn, is connected to field devices 43, 44 and 45 (of FIG. 1), the routine 100 could be used in any other process control system having distributed or centralized control functions. Furthermore, the routine 100 may be used with a tuning controller, such as the tuning controller 71 and an associated auto-tuning block (not shown) or may be used separate and apart from a tuning routine.

As indicated above, the routine 100 provides further control in an auto-tuning procedure and, specifically, enables a user to select desired robustness qualities for a control loop and have the tuning parameters which result, at least approximately, in a loop with the desired robustness qualities, determined automatically. If used with an auto-tuning procedure, the routine 100 may enable a user to simulate the response of a set of tuning parameters for the process control system determined by the auto-tuning procedure and to then change these tuning parameters based on desired robustness qualities.

In particular, the routine 100 may use the process parameters determined by a process characterization routine (such as that within the block 66 of FIGS. 2–4) or by any other process characterization routine to simulate the process and may use a controller of the type or form selected by the user (e.g., PID, PI, Fuzzy logic, etc.) having the tuning parameters determined by the auto-tuning routine 71 to simulate control of the process by the controller in response to, for example, a step or an impulse input, such as a setpoint change. The routine 100 may then plot the response of the control loop in a plot such as that illustrated on the right side of FIG. 6, which plots the process variable output PV, the setpoint SP and the controller output OUT verses time to illustrate, for example, overshoot, oscillation, response time, etc. of the loop. The simulation plot of FIG. 6 illustrates the response of the process control loop to a disturbance but could, instead, illustrate the response of the loop to a change in the setpoint (as is performed in the display of FIG. 7) or to a change in any other desired variable. As illustrated in FIG. 6, the plot or display may also illustrate the tuning parameters (such as the gain, reset and rate) for the controller for which the simulation plot was generated.

Figure 7:
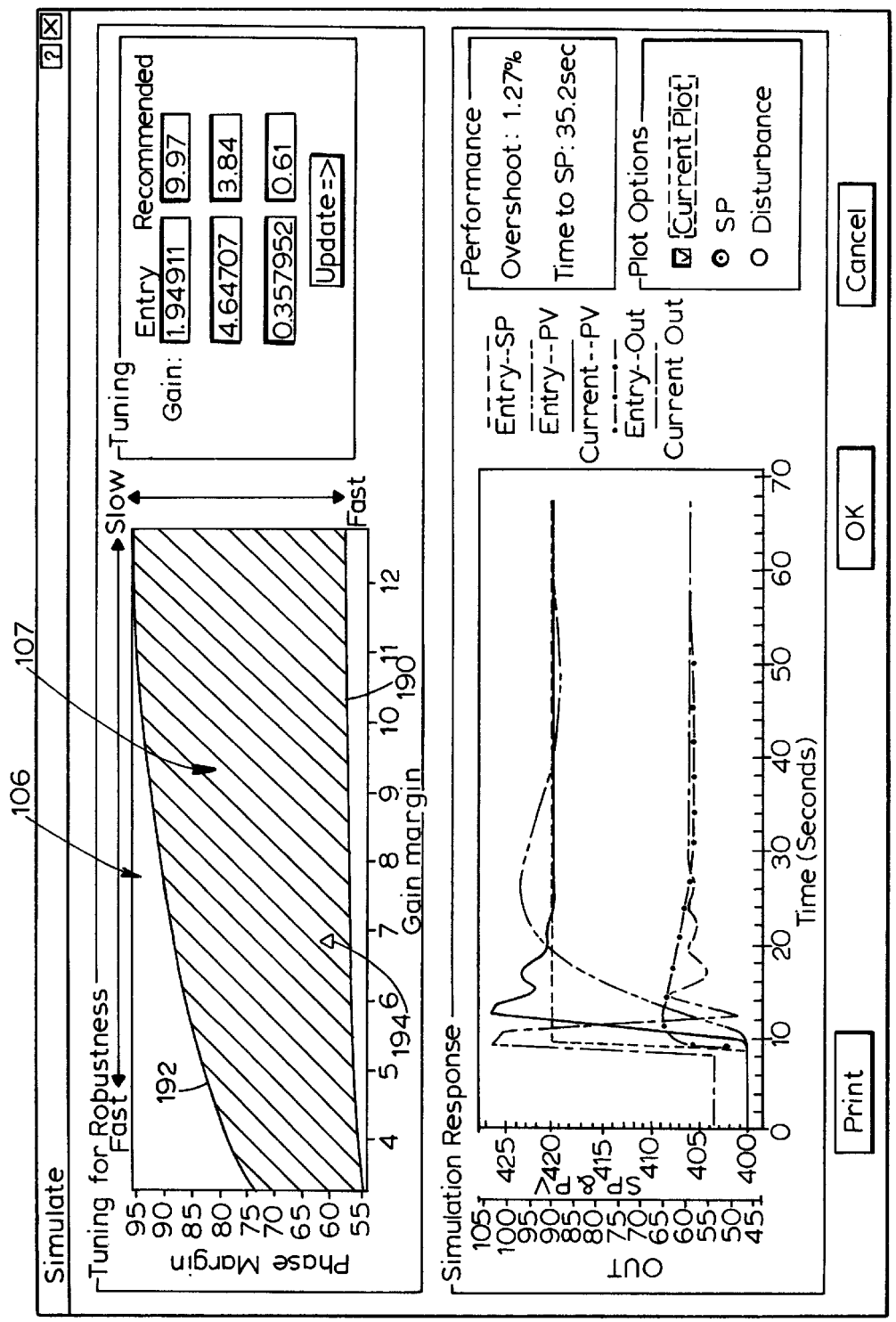
FIG. 7 is an example simulation screen display having a robustness map which may be used to choose a set of tuning parameters for a controller to provide a control loop having desired robustness qualities.

The routine 100 may also display a robustness map or plot, such as the robustness map 106 illustrated in FIG. 7. The display of FIG. 7 is similar to the display of FIG. 6, except that the display of FIG. 7 illustrates a simulation for a change in the setpoint and includes the robustness map 106 which plots phase margin (y-axis) versus gain margin (x-axis) for the process control loop. A stable region 107 (i.e., a region in which the control loop is stable) is illustrated in the robustness map 106 by cross hatching, although any other desired method of illustrating the stable region (or region of interest to a user) could be used instead. For example, the robustness map 106 may indicate the various regions of stability and instability using different colors, shading, etc. The robustness map 106 of FIG. 7 also illustrates the robustness qualities of the simulated control loop (i.e., having a controller with the displayed tuning parameters) as a point in the robustness map. Such a point is illustrated as a triangle 194 in FIG. 7.

According to the invention, the routine 100 determines a plurality of sets of tuning parameters for use in tuning the selected controller and the corresponding robustness qualities of the control loop having a controller tuned using these tuning parameters to create or identify the stable region 107 within the robustness map 106. Thereafter, the routine 100 may enable a user to select a point on the robustness map 106 and determine, from the selected point and the stored tuning parameters for other points on the robustness map 106, a further set of tuning parameters that will create a controller of the selected type which results in a control loop having the robustness qualities associated with the selected point. The routine 100 may then run a simulation using the new set of tuning parameters to enable the user to view the characteristics of this new controller. Such a simulation is illustrated within the Simulated Response section of the displays of FIG. 6 and 7. The user may then repeat the steps of selecting a point within the robustness map 106 to determine a new set of tuning parameters and viewing the simulation of the controller (or control loop) tuned using the newly determined tuning parameters until the user has obtained a set of tuning parameters that provides a control loop with the best mix of robustness and response qualities. In this manner, the user may quickly and easily select a set of tuning parameters which best suits the user's needs without having to perform a lot of trial and error guessing as to the set of tuning parameters to use.

Figure 8:
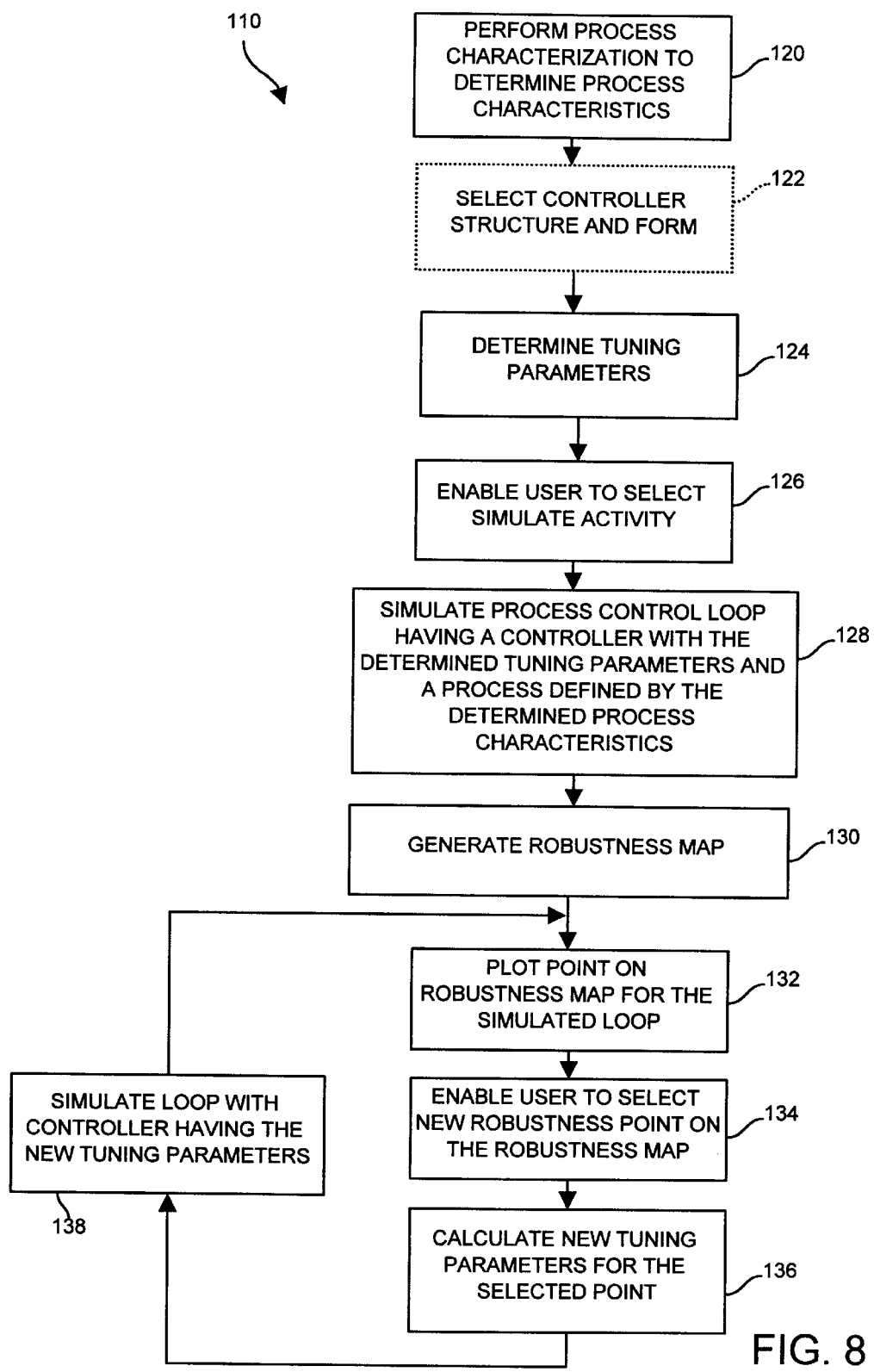
FIG. 8 is a flow chart illustrating a method of determining a robustness map such as that of FIG. 7.

FIG. 8 illustrates a general flow chart 110 of the steps which may be used to generate and use a robustness map to select a set of tuning parameters for a process control loop. At a first step 120, the user runs a process characterization procedure, such as any of the procedures discussed above within respect to the auto-tuner of FIGS. 1–5. Of course, it will be noted that the routine 100 can be used in distributed control systems, such as that described herein, as well as in centralized or standard control systems in which all activities are performed by a host device, a controller or a field device. In each of these cases, the routine 100 needs only to access the process parameters determined during the process characterization phase of, for example, an auto-tuning or other procedure.

At a step 122, the user selects the structure of the controller or the control routine to be used to control the process. The step 122 is illustrated in dotted relief to indicate that this selection can take place at any time prior to generating the robustness map and, thus, could be performed before the process characteristics are determined. In one embodiment, the routine 100 defaults to use the controller structure being used by the system within the auto-tuning procedure for which the process characteristics were determined. In the example described herein, it will be assumed that a PID type controller will be used to control a first order plus deadtime process, although the techniques described herein can be applied when using other types of processes and/or controllers. Of course, the PID controller may take on one of many different structures, such as a proportional (P), an integral (I) or a derivative (D) controller, or any combination of these, such as a PI, a PD, an ID, or a PID controller. Each of these controllers may be of any desired or known form. As is known, however, the use of a derivative only (D) controller is rare in process control systems.

Generally speaking, a PID control algorithm is a feedback control algorithm which uses a weighted combination of proportional, integral and derivative actions, operating on a process variable pv and a setpoint sp to control the process variable. Each of the proportional, integral and derivative actions has a tunable weighting factor. A general form of the PID control algorithm can be mathematically described as:

$$Out(t)=Kp \cdot p(t)+(1/Ti) \cdot \int e(t)dt+Td \cdot d'(t)$$

wherein:
Out(t)=the output of the control algorithm;
Kp=the proportional action weighting factor;
p(t)=the variable to which the proportional action is applied;
e(t)=the error calculated as e(t)=sp(t)−pv(t);
Ti=the inverse of the integral action weighting factor;
d(t)=the variable to which derivative action is applied;
d'(t)=the derivative with respect to time of d(t); and
Td=the derivative action weighting factor.
p(t) may be calculated as:

$$p(t)=b \cdot sp(t)-pv(t)$$

wherein:
sp(t)=the setpoint or target operating point of the control algorithm;
pv(t)=the process variable or measured variable; and
b=a weighting factor which determines the proportional action applied to the setpoint (normally constrained between zero and one).
Likewise, d(t) may be calculated as:

$$d(t)=g \cdot sp(t)-pv(t)$$

wherein:
g=a weighting factor which determines the derivative action that will be applied to the setpoint (normally constrained between zero and one).

Of course the PID control algorithm may be implemented using different forms and the determination of tuning factors for the PID control algorithm based on robustness qualities may be applied using any PID or sub-set of the PID control algorithm employing any combination of proportion, integral or derivative actions. An example of a different form of the PID control algorithm is:

$$Out(t)=Kp \cdot (p(t)+(1/Ti) \cdot \int e(t)dt+Td \cdot d'(t))$$

In this case the proportional weighting factor Kp is applied to all terms of the PID controller. Likewise, the PID algorithm may be configured or implemented to specifically determine which terms are to be employed, effectively creating subsets of the PID controller. Examples of such subsets or structures of the PID include:
P+D—only the proportional and derivative terms are to be employed;
P+I—only the proportional and integral terms are to be employed;
I+D—only the integral and derivative terms are to be employed;
P—only the proportional term is to be employed;
I—only the integral term is to be employed; and
D—only the derivative term is to be employed.

The choice of the PID structure to be used determines the setting of the weighting factors b and g. Of course, the PID inputs sp(t) and pv(t) can also be filtered using a variety of mathematical methods, which results in modification of the variables to which the PID actions are applied.

Referring again to FIG. 8, after the form and structure of the PID (or other controller) is determined, a block 124 determines a set of tuning parameters for use in tuning the PID or other control algorithm. Of course, these tuning parameters may be determined in any desired manner, such as using the tuning controller 71 described herein. These tuning parameters may be presented to a user on the user interface 103 such as that illustrated in FIG. 6 wherein the gain (Kp), reset (Ti) and rate (Td) are illustrated. At this time, a block 126 may enable the user to select a simulate activity for the determined set of tuning parameters. For example, a simulate button may be displayed on the user interface and the user may select that button to have the operation of the control loop using a controller with the determined tuning parameters simulated. Of course, the user may be able to enter a simulate activity in any other desired manner.

When the simulate activity is selected, a block 128 performs a simulate routine which simulates the process control loop having a process as characterized by the determined process characteristics determined at the step 120, a controller of the form and structure selected at the step 122 and the tuning parameters determined at the step 124. The simulate routine or block 128 may use any desired or known equations or method to simulate the process control loop in response to, for example, a step change, an impulse change or any other desired change in one of the control or process variables, such as the setpoint. The block 128 may generate a plot, such as those depicted in FIGS. 6 and 7, to illustrate the operation of the control loop in response to the change in the control or process variable, or may simulate the operation of the control loop in any other desired manner. Methods of simulating a process using the process characteristics and the controller form and structure are well known and need not be described further herein. However, one preferred method of simulating the control loop with the tuned controller therein may be performed using the modified Z transforms for the process and the controller tuned according to the determined set of tuning parameters. The use of modified Z transforms is well known in the art and is disclosed in, for example, Kuo, "Digital Control System," 2nd Ed., Saunders College Publishing (1992). However, the discrete (or differential) equations for the process and the controller (which will vary depending on the type of controller and process used) could be used to simulate the control loop, as is well known.

Next, a user may be able to select or view the robustness of the control loop generated using the controller tuned according to the determined tuning parameters to control the process characterized at the block 120. (Of course, the determined tuning parameters may be different parameters than the parameters actually used to tune the controller, so long as the parameters used to tune the controller can be calculated directly from the determined and stored tuning parameters). A block 130 generates a robustness map or plot, such as the map 106 of FIG. 7, in a manner that will be described hereinafter. The robustness map may take the form of a plot that illustrates phase margin versus gain margin, although other robustness qualities or measurements such as deadtime margin, dynamic margin (described hereinafter) or any other measure of stability could be used as well. Also, the robustness map could, if desired, plot only one robustness quality or three or more robustness qualities. As is known, the phase margin is the amount of dead time or phase that can be added into the process or the controller before the control loop becomes unstable, while the gain margin is the ratio of the maximum gain that can be used before the control loop becomes unstable to the current gain of the control loop (which includes controller gain as well as process gain). Generally speaking, the block 130 determines a significant range (which may be a line or an area) of robustness qualities which lead to a stable control loop for display in the robustness map and then iteratively calculates a number of sets of tuning parameters (for the controller structure and form selected by the user) at spaced points within the stable region of the robustness map. The determined tuning parameters may then be stored in association with the robustness qualities of the control loop to be used later. If desired, the robustness points (and the tuning parameters associated with these points) may be used to produce a closed form equation that describes the behavior of the tuning parameters within the stable region (i.e., the line or the area displayed on the robustness map). Alternatively, robustness map points may be selected at spaced locations throughout the stable region of the robustness map and the tuning parameters for these points may be determined. The selected robustness points (or tuning parameter points) may be regularly spaced or non-regularly spaced or spaced in any other pattern as desired.

At a block 132, the robustness qualities of the control loop are determined and the robustness of the control loop is plotted as a point on the robustness map. The calculation of the robustness qualities (such as the phase margin and the gain margin) of a control loop having a controller tuned with a determined set of tuning parameters is well known in the art and so will not be described herein. Next, a block 134 enables the user to select a new point on the robustness map by, for example, pointing to the desired robustness point (using, for example, a mouse, keyboard, light pen, touch screen, etc.) and clicking or otherwise selecting the point. The block 134 then determines the robustness qualities at the selected point (e.g., the phase margin and the gain margin of the selected point).

A block 136 then calculates the tuning parameters of the selected point by interpolating in any desired manner between, for example, the nearest robustness points for which tuning parameters have been calculated at the block 130 to determine the tuning parameters that will produce a control loop having approximately the selected robustness. If interpolation is performed, any desired interpolation method, such as straight line interpolation, area interpolation, etc. may be used. These interpolation methods are well known in the art and, so, will not be further described herein. Generally speaking, however, the interpolation may be performed by determining the two, four, etc. closest points in the robustness map for which tuning parameters were determined and stored at the step 130, accessing the actual tuning parameters determined for each of those points and interpolating between the tuning parameter points based on the distance (area, etc.) between the selected robustness point and the closest robustness points for which tuning parameters were determined. Interpolation may not be necessary if closed form equations for the robustness map have been determined, in which case, the closed form equations may be used to calculate the set of tuning parameters which results in a loop having the selected robustness qualities.

After the new set of tuning parameters for the selected point in the robustness map has been determined, a block 138 may simulate the control loop or the controller using these new tuning parameters in the same manner that the block 128 simulated the control loop. Next, control is provided to the block 132 and the actual robustness of the control loop using the new tuning parameters may be determined and plotted on the robustness map. Thereafter, at the block 134, the user may select a new robustness point, if so desired, to repeat the steps 136, 138 and 132 until the user has found a set of tuning parameters that gives the best set of robustness qualities and process control qualities as determined by the simulation routine. This procedure enables the user to quickly and easily determine any number of tuning parameters for a selected structure and form of a controller based on desired robustness qualities, and to view the control qualities of the controller generated using each of the sets of tuning parameters. Of course, if some of the selected tuning parameters produce a control loop that is unstable or marginally stable, this may be demonstrated on the robustness map using different colors, plotting characteristics, flashing lights, alarms, etc.

While FIG. 8 has been described as enabling a user to select desired robustness qualities using a graphical robustness map, it will be understood that the user could use any other method of selecting robustness qualities, such as inputting the desired robustness qualities via a keyboard, etc.

Figure 9:
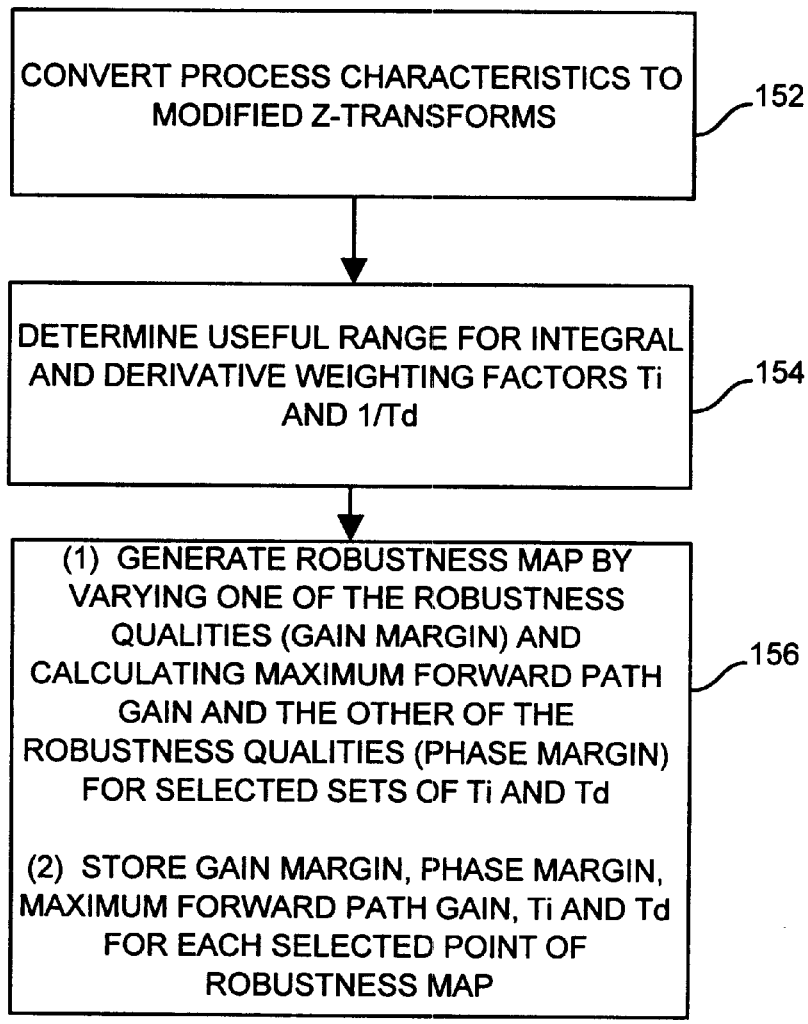
FIG. 9 is a further flow chart illustrating the steps in determining the robustness map of FIG. 7.

Referring now to FIG. 9, a routine or a flow chart 150 illustrates the steps which can be implemented to generate a robustness map, like the map 106 of FIG. 7, in the block 130 of FIG. 8. Generally speaking, the routine 150 uses the form and structure of the PID controller (including the relevant PID input filtering parameters, and PID tuning parameters specified by the user), the identified process parameters and whether or not the process is an integrating process (which can be specified by the user at any time before the first robustness initialization is performed), the PID tuning parameters calculated by the auto-tuner or subsequently entered by the user prior to robustness initialization and the user specified tuning method to generate the robustness map. Of course, the routine 150 may be stored in and executed in a processor 102 associated with a user interface, a controller or any other desired device having a processor and a memory. The routine 150 may, for example, be executed by the same device as, or a different device than, the device which performs the auto-tuning procedure, the process characterization procedure or the simulation procedure described herein.

A block 152 of the routine 150 preferably converts the identified process parameters to modified Z transform representations so that the dead times which are not multiples of the sample interval of the control loop can be handled accurately. The conversion from the time domain (or Laplace transform equations) to modified Z transforms can be performed using any well known technique and so will not be described herein. If desired, however, the time domain or frequency domain equations could be used instead.

A block 154 next determines the range of, for example, the integral and derivative weighting factors which will be plotted using the robustness map and thereby determines the characteristic form of the robustness map (i.e., whether the stable region will be a volume, an area, a line, etc.) If the robustness map is a volume, it may be, in some instances, an n-dimensional volume where n can be greater than three. Generally speaking, the structure of the PID controller determines the nature of the stable region of the robustness map. For example, if the structure of the controller is P+D, or I+D or I, then the stable region on the robustness plot will generally be a line. If the structure of the controller is P+I, then the stable region on the robustness map will generally be an area. If the structure of the controller is a P+I+D, then the stable region of the robustness map can be a volume. In the case of the P+I+D controller structure, a slice of the volume may be determined by the routine 150 and this slice may be plotted on a two dimensional plot to ease the understanding and use of the robustness map. However, if desired, the entire stable region may be displayed in the robustness map in a three dimensional manner using, for example, a three dimensional plot, a number of two dimensional plots or any other desired technique.

The range of the integral and derivative weighting factors to be used in the robustness map may be determined in any desired manner. For example, these ranges may be set or predetermined, may be input by the user or may be calculated based on the structure of the PID controller and the process characteristics. One method of calculating the ranges of the derivative and the integral weighting factors for a dead time process with one pole or for an integrating process with dead time is provided below. As is known, poles and zeroes for a process refer to the transfer functions of the process whose time dependencies must be generally expressed in the form of complex values (values which have real and imaginary components). An example of this is the general solution to the nth order polynomial (in Laplace notation) $a0+a1 \cdot s1+ \ldots an \cdot sn$. A transfer function which includes such a polynomial in either the numerator or the denominator may have complex or real poles and zeroes. For a series form PID (which can always be converted to the general form given above) the following method may be used, in which the block 154 uses the knowledge of whether the process is an integrating or a non-integrating process.

(1) If the process is an integrating process and the controller structure is P+D, then:

The integral weighting factor (1/Ti) is set to zero.

$$Td = a \cdot DT$$

wherein:
DT=the dead time of the process; and
a=a tunable constant (preferably having a value of approximately 0.5).

Here, the derivative weighting factor is set to a constant and, in a general sense, the proportional weighting factor is allowed to change when developing the robustness map. In this case, the resulting stable region of the robustness map will be a line. However, if desired, the derivative weighting factor could allowed to change between two values which would result in the stable region within the robustness map being an area. However, because the derivative component plays such a small or insignificant role in most P+D controllers, it is mathematically and computationally easier to set the derivative factor to a constant (or to zero).

(2) If the process is an integrating process and the controller structure is P+I or P+I+D, then:

$$Td = a \cdot DT \text{ (a equals zero for a P+I controller)}$$

$$RV1Ti = b/\text{integrating gain}$$

wherein:
b=a tunable constant with a value typically around 10;
Ti=the inverse of Ki; and
RV1Ti=Range Value 1 of Ti.

$$RV2Ti = c/\text{integrating gain}$$

wherein:
c=a tunable constant with value typically around 5; and
RV2Ti=Range Value 2 of Ti.

As will be understood, the integrating gain is one of the process characteristics determined by the process characterization routine. Here, the value of Ti is varied between the two range values RV1Ti and RV2Ti for each of these controllers. Thus, for each of these cases, the stability region of the robustness plot will be an area because both the integral weighting factor and the proportional weighting factor are allowed to change when determining the robustness map. The derivative weighting factor could be allowed to change in a PID controller, which would result in a stability region being a volume. However, to present the stability region as a two-dimensional region, and because the derivative component usually plays a lesser role in the choice of tuning parameters for a P+I+D controller, the derivative weighting factor is set to a constant value in this example.

Generally speaking, it makes no sense or provides for unstable control to use an integrating only (I) controller or a derivative only (D) controller or an I+D controller with an integrating process. As a result, a check may be performed to tell the user that this choice of a controller structure in an integrating process should be avoided. Likewise, a pure proportional (P) controller could be used, in which case the derivative and integral weighting factors are set to zero and the proportional weighting factor is allowed to change with the change in the robustness quality, which results in a stability region on the robustness map that is a line.

(3) If the process is a non-integrating process and the controller structure is P+D, then:

The integral weighting factor (1/Ti) is set to zero.

$$Td = 0$$

Here, again, the derivative weighting factor is set to zero (or some other constant) and, in a general sense, the proportional weighting factor is allowed to change when determining the robustness map. In this case, the resulting stable region of the robustness map will be a line. However, if desired, the derivative weighting factor could allowed to change between two values which would result in the stable region within the robustness map being an area. However, because the derivative component plays such a small role in most P+D controllers, it is mathematically and computationally easier to set the derivative weighting factor to a constant.

(4) If the process is a non-integrating process and the controller structure is I+D or I, then:

$$Td = 0$$

Here, because Td is set to zero (or some other constant), the region of stability will be a line. However, the integral weighting factor (1/Ti) is allowed to vary and will be determined based on value of the robustness quality selected for the map. In other words, because the region of stability within the robustness map for this case is a line, and because the proportional weighting factor is set to zero, there will be only one value for Ti for any particular value of the robustness quality, e.g., the gain margin or the phase margin and, thus, it is not necessary to define a range for the variation of Ti as Ti is completely dependent on the variation performed in robustness quality.

(5) If the process is a non-integrating process and the structure is P+I or P+I+D, then:

$$RV1Ti = \text{Max}(0.5 \cdot DT, \tau)$$

$$RV2Ti = f1(DT, \tau, RV1Ti)$$

$$RV1Td = \text{Min}(0.5 \cdot DT, \tau)$$

$$RV2Td = f2(DT, RV1Td)$$

wherein $\tau$ is the time constant representation of the single pole of the process.

The f1 and f2 functions may be determined offline as a function of deadtime, one or more of the process characteristics, such as the time constant $\tau$ and the other range value. In a preferred embodiment, a number of simulations were run to determine the relationships between DT, and $\tau$ which provided values of Ti and Td that produced the best disturbance response rejection (using an integral of the absolute error method). In this case, the f1( ) and f2( ) terms were heuristically determined as lines that, for higher gain margins, yield an integrated absolute error at or near the minimum for a first order plus dead time process and these terms may be set as:

$$f1(\ ) = (0.1754 + 0.1 \cdot DT/(RV1Ti + DT)) \cdot (RV1Ti + DT)$$

$$f2(\ ) = 0.85 \cdot (RV1Td)$$

However, the range values of the Td and Ti factors could be determined in any other manner to provide a useful region over which the process control loop is stable for use in creating the robustness map.

As will be understood, from these equations, a single value or a range of values for each of the proportional and integral weighting factors is determined, based on the controller structure and the process. It will be understood, however, that the basic methods and functions provided for determining the range of Ti and Td in the above equations are not particularly relevant. Instead, it is important to determine some region of the robustness map for which the Ti and Td combinations that ultimately result will be useful (e.g., stable).

After the block 154 determines ranges for the integral and derivative weighting factors, a block 156 generates the data for the robustness map. The block 156 may perform an iterative procedure which varies one of the robustness qualities (such as the gain margin) and which determines the other of the robustness qualities (e.g., the phase margin) and the other of the tuning parameters (such as the proportional weighting factor Kp or the maximum forward path gain) at each of the selected gain margins and, if necessary, for each set of Ti and Td values between the ranges established therefor in the block 154. Thus, the values of Ti and Td may be iteratively varied between the range values established therefor for each selected gain margin to produce a number of robustness points at each of the selected gain margin intervals. Of course, if only one value for either of the Ti and Td is determined, then this value will be used in each iterative calculation for a particular gain margin. If a range is provided for both the Ti and Td values, a first one may be held constant while the second one is changed in steps between the two ranges for that variable. Thereafter, the first one will be changed by a step and the second one will again be changed in steps over its associated range, and so on until the first variable has been changed over its entire range. This process may be repeated for each selected value of the gain margin (or phase margin).

Thus, in one embodiment, a range of gain margins is selected and this range is divided into a number of steps, such as 10, 100, 1000, etc. For each of the selected gain margins, i.e., the gain margin at each of the steps in the gain margin range, the set of Ti and Td weighting factors are varied between the ranges selected for those factors and, at each set of Ti, Td and gain margin, the phase margin and the proportional gain weighting factor Kp (or alternatively, the maximum forward path gain which, for the purposes hereof is a tuning parameter from which the Kp factor can be determined) are calculated and stored. When only one of the Ti or Td weighting factors is varied between two values, and the other is set at zero or to a constant, then the iterative calculations produces an area in the robustness map having numerous points at each of the selected gain margin values. If however, both of the Ti and Td weighting factors are varied between two values, then a volume will be created if these factors are varied between the two ranges for each of the different gain margin values. To create a two dimensional plot and to save on calculations, a slice through this volume may be displayed on the robustness map by holding one of the Ti and Td weighting factors constant or, alternatively, by varying the Ti and Td values together. For example, the first set of Ti and Td values may the minimum value of each of the Ti and Td ranges. However, instead of holding the Ti value at the minimum and varying the Td value between its minimum and maximum value, the next set of Ti and Td values (for the same gain margin) may be the minimum value of Ti plus 10 percent (or some other percentage) of the Ti range and the minimum value of Td plus 10 percent (or any other desired percentage) of the Td range. In this manner, the Ti and Td values are varied together across their respective ranges, which reduces the number of points determined for the robustness map and computes robustness points within an area of the robustness map, instead of within a volume.

The phase margin and the maximum forward path gain, which are well known terms of art, may be calculated as follows during each iteration. For each Ti and Td combination between the range values computed above (inclusive of the range values) using a step size which may be the same or different for the Ti and Td values (and which may be adjusted separately or together for these variables), the maximum forward path gain is found. To find the maximum forward path gain, the block 156 first finds the frequency where, with Kp=1 and the process static gain=1, the combined phase shift of the PID controller and the process is 180 degrees, which is referred to as the phase crossover frequency. This calculation may be performed by converting the modified Z transform representation of the process and the PID controller to the frequency domain representation and iteratively adjusting the frequency until the combined phase shift of the PID controller and the identified process is 180 degrees. At this frequency, the maximum forward path gain at which the control loop will become unstable can be calculated as:

$$\text{Maximum Forward Path Gain} = 1/(|PID(\omega_{180})| \cdot |\text{Process}(\omega_{180})|)$$

wherein:

$|PID(\omega_{180})|$ = the dynamic gain of the PID controller at the phase crossover frequency; and $|\text{Process}(\omega_{180})|$ = the dynamic gain of the process at the phase crossover frequency.

The computation of the dynamic gain of the process is well known and so, will not be described further herein.

Next, for each gain margin between the minimum gain margin and the maximum gain margin, inclusive of the maximum and minimum gain margins, with the step size used to select values between the minimum and the maximum gain margin being arbitrary or up to the user, the block 156 computes the phase margin. To determine the phase margin at any gain margin value (and at the values of Ti and Td being currently used), the step 156 first finds the frequency at which the combined gain of the PID controller and the process is one (1), referred to as the gain crossover frequency. The gain crossover frequency may be determined by using the frequency domain representation referenced previously and by adjusting the frequency until the combined gain is one (1). In this case, the combined gain includes the maximum forward path gain/gain margin. At the frequency where the combined gain is one (1), the phase margin can be calculated as:

$$\text{Phase margin} = \angle PID(\omega_1) + \angle Process(\omega_1) + 180$$

wherein:

$\angle PID(\omega_1)$=the phase shift of the PID controller in degrees at the gain crossover frequency; and $\angle Process(\omega_1)$=is the phase shift of the process in degrees at the gain crossover frequency.

Typically speaking, the $\angle PID(\omega_1) + \angle Process(\omega_1)$ terms provides a negative angle and, thus, the phase margin computation subtracts these angles from 180 degrees. However, care must be taken to assure that the proper subtraction of 180 degrees is performed in situations in which one or both of the $\angle PID(\omega_1) + \angle Process(\omega_1)$ terms are positive.

Once the maximum forward path gain and the phase margins have been found for each set of Ti, Td and gain margin, the robustness map can be drawn. That is, after varying the Ti and Td values between their respective ranges, for each of the selected gain margin values and determining the phase margin and the maximum forward path gain at each of the Ti, Td and gain margin combinations, the data for robustness map has been determined and the robustness map may be displayed. The information stored for each point in the robustness map (i.e., each combination of Ti, Td and gain margin) may be the maximum forward path gain and the phase margin. However, if desired, the proportional gain (which can be computed directly from the maximum forward path gain value) can be stored in addition to or instead of the maximum forward path gain.

When the robustness plot is an area, the maximum and minimum phase margin for each value of gain margin is found using, for example, a simple min/max search function on each of the stored points having the value of the gain margin. The vertical axis of the robustness map may be phase margin and preferably has a range inclusive of the maximum of the maximum phase margin at the various gain margins and the minimum of the minimum phase margin of the various gain margins. The set of minimum phase margins at the various gain margins define a line which is a lower stability boundary defined by, for example, the line 190 in FIG. 7 while the set of maximum phase margins for the various gain margins define a line which is an upper stability boundary defined by, for example, the line 192 in FIG. 7. The area between these lines is the stability region which includes the points for which the PID controller tuning parameters (Ti, Td and maximum forward path gain) have been determined.

To place the initially calculated or currently active tuning parameters on the robustness plot, the phase margin and the gain margins associated with the loop having a controller with these tuning parameters are determined using any well known technique. The calculated phase margin and gain margin are the coordinates for placing a symbol representing these tuning parameters on the robustness plot. Such a point is illustrated in FIG. 7 as the triangle 194.

If desired, the routine 150 may calculate the dead time margin and the dynamic margin for the initial set of tuning parameters or for a selected set of tuning parameters. As is known, the dead time margin is a multiplier which, if applied to the identified process dead time, will cause the control loop to become unstable (e.g., the additional dead time which may be added to the control loop before the control loop becomes unstable). Dead time margin may be directly calculated from the phase margin and the gain crossover frequency and this computation is well known in the art.

Dynamic margin, which is a concept coined herein, is a multiplier which, when applied to the all of the dynamic elements of the identified process control loop (such as the time constants and dead time, i.e., effectively the poles and zeros plus deadtime of the process), will cause the process control loop to become unstable for those values of the dynamic elements. Dynamic margin for a selected set of tuning parameters is calculated by finding the gain margin and phase margin for the selected set of tuning parameters and by then iteratively adjusting the multiplier applied to the dynamic elements until the phase shift reaches 180 degrees at the gain crossover frequency or until the gain margin is less than one (1) at the phase crossover frequency. The value of the multiplier when either of these conditions occurs is the dynamic margin. In some cases, there may be more than one dynamic margin associated with a particular process control loop.

Of course, as noted above, the routine 100 may simulate the performance of the initial tuning parameters using any known or desired technique. Once the robustness map has been initialized and created, the robustness map need not be drawn again for the loop unless the identified process parameters or the controller structure is changed.

During a simulation procedure, the user may select tuning parameters using the robustness map. For example, the user may select PID tuning parameters from the robustness map by clicking on a point within the stable region (i.e., for which tuning parameters have been determined). If the robustness map is a line, the region for which there are tuning parameters is simply the region on that line. When the user clicks on the robustness map, the routine 100 may provide the selected phase margin and gain margin coordinates associated with the selected point. The phase margin and gain margin coordinates are used as inputs to the interpolation routine 136 (FIG. 8) which calculates the PID tuning parameters from the stored tuning parameters generated above. Of course, the interpolation method may vary depending upon the amount of information stored and whether or not the robustness map is a line or an area. For example, if the robustness map is a line, the interpolation technique may be a two point method while, if the robustness map is an area, the interpolation technique may be a four point method. Of course, the interpolation method may use linear or nonlinear interpolation techniques. After performing the interpolation, the calculated PID tuning parameters may be displayed to the user. As noted above, a simulation using the newly selected tuning parameters and the identified process parameters can then be executed and the response of pv(t), out(t) and sp(t) can be plotted as a trend of these variables versus time, such as that illustrated in FIGS. 6 and 7. Likewise, the dead time margin and dynamic margin can be calculated for the selected tuning parameters and provided to the user.

As will be understood, during the simulation, the routine 100 uses a mathematically exact representation of the PID controller structure selected by the user and a modified Z transform of the process. The user selects the response type he or she wants to simulate (setpoint response, disturbance response, etc ) so that, when simulation is triggered, that response type is simulated by changing the necessary simulation variable(s). The mathematical outputs of the simulation are the values of sp(t), out(t), pv(t) at the sample intervals of the control loop. These outputs are then plotted versus the simulated time, providing a trend plot such as that of FIGS. 6 and 7. Triggering of the simulation may be performed by selection of a point within the robustness map, which enables the user to use stability qualities to select a controller to simulate, which thereby allows the user to select tuning parameters based on stability (or robustness) qualities and immediately see the control response associated with the selected tuning parameters. Using the combined robustness map and the simulation capabilities, the user may select new tuning points until the user gets the best desired combination of response and stability characteristics he or she desires.

While the robustness map has been described as being generated by determining a range for two of the tuning parameters (Td and Ti) and varying the gain margin to calculate the resulting phase margin and maximum forward path gain, the phase margin (or other robustness quality) could be varied and the gain margin could be calculated. Likewise, the range for different ones of the tuning parameters, instead of Ti and Td, could be established and used also, so long as a variation in one of the robustness qualities is used to compute one or more tuning parameters and the other of the robustness qualities.

Although the robustness plot generator and the simulator described herein are preferably implemented in software stored in, for example, a controller, a user interface, or other process control device, they may alternatively or additionally be implemented in hardware, firmware, etc., as desired. If implemented in software, the robustness plot generator and the simulator of the present invention may be stored in any computer readable memory such as on a magnetic disk, a laser disk, optical disk or other storage medium, in a RAM or ROM of a computer, controller, field device, etc. Likewise, this software may be delivered to a user or a device via any known or desired delivery method including, for example, over a communication channel such as a telephone line, the Internet, etc.

Also, while the robustness plot generator and simulator of the present invention are described in detail in conjunction with a process control network that implements process control functions in a decentralized or distributed manner using a set of Fieldbus devices, it will be understood that the robustness plot generator and simulator of the present invention can be used with process control networks that perform control functions using other types of field devices and communication protocols, including protocols that rely on other than two-wire buses and protocols that support analog and/or digital communications. For example, the these devices can be used in any process control network that uses devices conforming to the HART, PROFIBUS, etc. communication protocols or any other communication protocol that now exists or that may be developed in the future.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention.

What is claimed is:

1. A method of determining tuning parameters for use in tuning a controller used in a process control loop, the method comprising the steps of:
    creating a robustness map that plots a robustness quality of the process control loop, including the step of determining a plurality of sets of tuning parameters and a value for the robustness quality of the process control loop for each of the sets of tuning parameters;
    enabling a user to select a point within the robustness map; and
    using at least two of the determined plurality of sets of tuning parameters to generate a further set of tuning parameters which, when used to tune the controller, causes the process control loop to have the approximate value of the robustness quality associated with the selected point.

2. The method of determining tuning parameters of claim 1, wherein the step of creating the robustness map includes the step of plotting two or more robustness qualities and wherein the step of determining includes the steps of varying one of the robustness qualities over a range and determining a set of tuning parameters and another one of the robustness qualities for each of a number of selected values of the one of the robustness qualities within the range.

3. The method of determining tuning parameters of claim 1, wherein the step of creating the robustness map includes the step of plotting two or more robustness qualities and wherein the step of determining includes the steps of establishing a tuning parameter range for one of the tuning parameters, varying one of the robustness qualities over a robustness quality range, varying the one of the tuning parameters over the tuning parameter range at each of a first number of selected points within the robustness quality range and determining a second tuning parameter and another one of the robustness qualities for each of a second number of points within the tuning parameter range for each of the first number of selected points within the robustness quality range.

4. The method of determining tuning parameters of claim 3, wherein the step of determining the second tuning parameter includes the step of determining the second tuning parameter as a maximum forward path gain.

5. The method of determining tuning parameters of claim 3, wherein the step of varying one of the tuning parameters includes the step of varying an integral weighting factor or a derivative weighting factor over the tuning parameter range.

6. The method of determining tuning parameters of claim 1, wherein the step of using at least two of the determined plurality of sets of tuning parameters includes the step of interpolating between the at least two of the determined plurality of sets of tuning parameters.

7. The method of determining tuning parameters of claim 1, further including the step of simulating the process control loop when using a controller tuned according to the further set of tuning parameters.

8. The method of determining tuning parameters of claim 1, wherein the step of determining includes the step of determining the plurality of sets of tuning parameters so as to define a stable region within the robustness map, including the steps of selecting a first range for a first one of the tuning parameters, selecting a second range for a second one of the tuning parameters, iteratively changing the first and second tuning parameters over the first and second ranges to create multiple sets of first and second tuning parameters and determining a value for the robustness quality for each of the multiple sets of first and second tuning parameters.

9. The method of determining tuning parameters of claim 1, further including the step of determining a dynamic margin associated with the further set of tuning parameters.

10. The method of determining tuning parameters of claim 1, wherein the step of creating the robustness map includes the step of creating a robustness map that plots phase margin and gain margin.

11. A method of determining a set of tuning parameters for use in tuning a controller that is adapted to be used in a process control loop, the method comprising the steps of:
 determining a plurality of sets of tuning parameters for use in tuning the controller and an associated robustness quality for each of the plurality of sets of tuning parameters, wherein said plurality of sets of tuning parameters and associated robustness quality define a stable region within a robustness map;
 plotting the stable region of the robustness map to illustrate the robustness quality of the stable region;
 enabling a user to select a point within the robustness map; and
 using at least two of the plurality of sets of tuning parameters to determine a further set of tuning parameters, wherein said further set of tuning parameters is associated with the selected point within the robustness map and wherein the controller, when tuned according to the further set of tuning parameters, causes the process control loop to have approximately the robustness quality of the selected point.

12. The method of determining a set of tuning parameters of claim 11, further including the step of simulating the process control loop when using a controller tuned according to the further set of tuning parameters.

13. The method of determining a set of tuning parameters of claim 11, wherein the step of plotting the stable region of the robustness map includes the step of plotting phase margin versus gain margin.

14. The method of determining a set of tuning parameters of claim 11, wherein the step of enabling the user includes the step of enabling the user to move a cursor over the point within the robustness map and to use the cursor to select the point.

15. The method of determining a set of tuning parameters of claim 11, wherein the step of using at least two of the plurality of sets of tuning parameters includes the step of interpolating between the at least two of the plurality of sets of tuning parameters to determine the further set of tuning parameters.

16. The method of determining a set of tuning parameters of claim 11, wherein the step of determining a plurality of sets of tuning parameters includes the steps of selecting a first range for a first one of the tuning parameters, selecting a second range for a second one of the tuning parameters, iteratively changing the first and second tuning parameters between the first and second ranges to produce multiple sets of first and second tuning parameters and determining the robustness quality for each of the multiple sets of first and second tuning parameters.

17. The method of determining a set of tuning parameters of claim 11, further including the step of determining a dynamic margin associated with the further set of tuning parameters.

18. The method of determining a set of tuning parameters of claim 11, wherein the robustness quality is a first robustness quality, wherein the step of determining a plurality of sets of tuning parameters includes the steps of varying the first robustness quality over a range and determining a tuning parameter and a second robustness quality for each of a number of selected values within the range.

19. The method of determining a set of tuning parameters of claim 11, wherein the robustness quality is a first robustness quality, and wherein the step of determining a plurality of sets of tuning parameters includes the steps of establishing a tuning parameter range for one of the tuning parameters, varying the first robustness quality over a robustness quality range, varying the one of the tuning parameters over the tuning parameter range at each of a first number of selected points within the robustness quality range and determining a second tuning parameter and a second robustness quality for each of a second number of points within the tuning parameter range for each of the first number of selected points within the robustness quality range.

20. A tuning system adapted to be used with a processor to tune a process control loop having a controller capable of being tuned according to a set of tuning factors, the tuning system comprising:
 a computer readable medium;
 a first routine stored on the computer readable medium and adapted to be executed on the processor to create a robustness map by determining a plurality of sets of tuning parameters for use in tuning the controller and an associated robustness quality for each of the sets of tuning parameters, wherein said plurality of sets of tuning parameters and associated robustness quality define a continuous region within the robustness map;
 a second routine stored on the computer readable medium and adapted to be executed on the processor to enable a user to select a point within the robustness map; and
 a third routine stored on the computer readable medium and adapted to be executed on the processor to use at least two of the determined plurality of sets of tuning parameters to generate a further set of tuning parameters which, when used to tune the controller, causes the process control loop to have the approximate robustness quality associated with the selected point.

21. The tuning system of claim 20, wherein the first routine is adapted to determine first and second robustness qualities for each of the sets of tuning parameters.

22. The tuning system of claim 21, wherein the first robustness quality is gain margin and the second robustness quality is phase margin.

23. The tuning system of claim 21, wherein the controller is a proportional-integral-derivative type controller and wherein the each of the determined plurality of sets of tuning parameters includes an indication of a proportional weighting factor, an indication of an integral weighting factor and an indication of a derivative weighting factor.

24. The tuning system of claim 23, wherein the indication of the proportional weighting factor is a maximum forward path gain.

25. The tuning system of claim 21, wherein the third routine is adapted to interpolate between the at least two of the determined plurality of sets of tuning parameters.

26. The tuning system of claim 21, further including a fourth routine adapted to simulate the process control loop when using a controller tuned according to the further set of tuning parameters.

27. The tuning system of claim 21, further including a fourth routine adapted to determine a dynamic margin associated with the further set of tuning parameters.

28. The tuning system of claim 21, wherein the first routine is adapted to vary one of the robustness qualities over a range and to determine one of the tuning parameters and another one of the robustness qualities for each of a number of selected values within the range.

29. The tuning system of claim 21, wherein the first routine is adapted to establish a tuning parameter range for one of the tuning parameters, to vary one of the robustness qualities over a robustness quality range, to vary the one of the tuning parameters over the tuning parameter range at each of a first number of selected points within the robustness quality range and to determine a second tuning parameter and another one of the robustness qualities for each of a second number of points within the tuning parameter range for each of the first number of selected points within the robustness quality range.

30. The tuning system of claim 29, wherein the first routine is adapted to determine the second tuning parameter as a maximum forward path gain.

31. The tuning system of claim 29, wherein the first routine is adapted to determine the one of the tuning parameters by selecting a value for an integral weighting factor or for a derivative weighting factor.

32. A tuner for use in tuning a process control loop having a controller capable of being tuned with a set of tuning factors, the tuner comprising:
   a first element that creates a robustness map by determining a plurality of sets of tuning parameters for use in tuning the controller and two or more associated robustness qualities for each of the plurality of sets of tuning parameters, wherein said plurality of sets of tuning parameters and associated robustness qualities define a continuous region within the robustness map;
   a second element that enables a user to select a point within the robustness map; and
   a third element that uses at least two of the determined plurality of sets of tuning parameters to generate a further set of tuning parameters which, when used in the controller, causes the process control loop to have the approximate robustness qualities associated with the selected point.

33. The tuner of claim 32, wherein the first robustness quality is gain margin and the second robustness quality is phase margin.

34. The tuner of claim 32, wherein the first element varies one of the robustness qualities over a range and determines one of the tuning parameters and another one of the robustness qualities for each of a number of selected values within the range.

35. The tuner of claim 34, wherein the first element determines the one of the tuning parameters as a maximum forward path gain.

36. The tuner of claim 32, wherein the third element interpolates between the at least two of the determined plurality of sets of tuning parameters.

37. The tuner of claim 32, further including a simulator element that simulates the process control loop when using a controller tuned according to the further set of tuning parameters.

38. The tuner of claim 32, further including a fourth element that determines a dynamic margin associated with the further set of tuning parameters.

* * * * *